US011008076B2

(12) United States Patent
Gordon, II

(10) Patent No.: US 11,008,076 B2
(45) Date of Patent: May 18, 2021

(54) DATA RETRIEVAL AND TRANSMITTING MARINE EXPLORATION VESSEL SYSTEMS

(71) Applicant: John Taylor Gordon, II, Denver, CO (US)

(72) Inventor: John Taylor Gordon, II, Denver, CO (US)

(*) Notice: Subject to any disclaimer, the term of this patent is extended or adjusted under 35 U.S.C. 154(b) by 78 days.

(21) Appl. No.: 16/406,011

(22) Filed: May 8, 2019

(65) Prior Publication Data
US 2020/0385093 A1 Dec. 10, 2020

Related U.S. Application Data

(63) Continuation-in-part of application No. PCT/US2018/063946, filed on Dec. 4, 2018.
(Continued)

(51) Int. Cl.
B63B 35/50 (2006.01)
B63G 8/00 (2006.01)
(Continued)

(52) U.S. Cl.
CPC ............. B63B 35/50 (2013.01); B63G 8/001 (2013.01); B63G 8/42 (2013.01); B64C 39/024 (2013.01);
(Continued)

(58) Field of Classification Search
CPC ........ B63B 35/50; G05D 1/101; G05D 1/048; G05D 1/0011; B64C 39/024; B63G 8/001;
(Continued)

(56) References Cited

U.S. PATENT DOCUMENTS 6,276,625 B1 8/2001 Chee et al.
6,322,406 B1 11/2001 Griffith, Sr. et al.
(Continued)

FOREIGN PATENT DOCUMENTS

AU 2008231262 B2 10/2008
CN 204900161 U 12/2015
(Continued)

OTHER PUBLICATIONS

Captain Andrew Morris,, "Legal Issues Relating to Unmanned Maritime Systems Monograph", U.S. Naval War College, 2013 (Year: 2013).*

Primary Examiner — Anthony D Wiest
(74) Attorney, Agent, or Firm — Will Hunziker

(57) ABSTRACT

A Data Transmitting Marine Vessel System (DRTMEVS) that deploys and provisions the operation of both an aerial visual and data collection drone and an underwater camera and data collection system ROV to gather data at, above, and below the surface of the water simultaneously or individually, or in multiples. The vessel having geodetic and GPS guidance systems that determine the course and actions of the crafts either in a pre-programmed autonomous mode or from a remote operator. The control of the three separate remotely controlled data collection systems and craft are consolidated in the form of a vessel of (DRTMEVS) and monitored via a multitude of possible signals anywhere in the world from a control center such as an individual computer.

15 Claims, 20 Drawing Sheets

Related U.S. Application Data

(60) Provisional application No. 62/708,102, filed on Dec. 4, 2017.

(51) Int. Cl.
    *B63G 8/42*         (2006.01)
    *B64C 39/02*      (2006.01)
    *G05D 1/00*       (2006.01)
    *G05D 1/04*       (2006.01)
    *G05D 1/10*       (2006.01)

(52) U.S. Cl.
    CPC ........... *G05D 1/0011* (2013.01); *G05D 1/048* (2013.01); *G05D 1/101* (2013.01); *B63G 2008/007* (2013.01); *B63G 2008/008* (2013.01)

(58) Field of Classification Search
    CPC ................ B63G 8/42; B63G 2008/007; B63G 2008/008
    See application file for complete search history.

(56) References Cited

U.S. PATENT DOCUMENTS

| | | |
|---|---|---|
| 7,252,046 B1 | 8/2007 | Ead et al. |
| 9,457,915 B2 | 10/2016 | Wang |
| 10,019,002 B2 * | 7/2018 | Harnett .................. G01S 13/88 |
| 2005/0124234 A1 | 6/2005 | Sells et al. |
| 2008/0216727 A1 | 9/2008 | Philippe et al. |
| 2009/0308299 A1 | 12/2009 | Luccioni et al. |
| 2015/0027125 A1 | 1/2015 | Raj |
| 2015/0214862 A1 | 7/2015 | Dakhil |
| 2016/0147223 A1 | 5/2016 | Edwards et al. |
| 2017/0291670 A1 | 10/2017 | Johnson |
| 2019/0128711 A1* | 5/2019 | Connor .................. B63G 8/001 |

FOREIGN PATENT DOCUMENTS

| | | |
|---|---|---|
| CN | 108693849 A | 10/2018 |
| DE | 102005022923 A1 | 11/2006 |
| KR | 20110108435 A | 10/2011 |

* cited by examiner

DATA RETRIEVAL AND TRANSMITTING MARINE EXPLORATION VESSEL SYSTEMS

CROSS-REFERENCE TO RELATED APPLICATIONS

This application is a Continuation in part application claiming the benefit of PCT Application No. PCT/US18/63946, filed on Dec. 18, 2018 which claims the benefit of U.S. Provisional Patent Application No. 62/708,102, filed on Dec. 4, 2017; both of which are titled "Data Retrieval and Transmitting Marine Exploration Vessel Systems" and are incorporated by reference herein in their entirety for all purposes.

BACKGROUND OF THE INVENTION

1. Field of the Invention

The information disclosed and claimed below relates to marine audio-visual information retrieval and transmission from: an independent remote controlled vessel with video and data gathering at, above, and below the surface of any body of water.

2. Description of Related Art

The knowledge gained throughout history by oceanic explorers, researchers, and underwater adventurers is germane to the creation of the present invention as is the evolution of watercraft design, shape, and performance. The prior art the present invention draws from is a combination of the use of marine drones, aerial drones, and submersable drones. Until now drones have been useful for gathering information and data but have been severely limited to where and how they could do so. Aerial drones need safe places to land, submersible drones need safe places to dock, and marine drones need a consistent source of power. The present invention solves all these problems by providing for a satellite guided self-power unmanned marine vessel with docking for aerial and submersible drones. The multifaceted energy generation systems of the present invention allow the vessel to carry out missions manned craft are incapable of, whereas the present invention will provide these services at a significantly reduced cost. The craft has the combined capabilities to get the same or similar results as a ship and crew using an underwater ROV and a drone or helicopter without the costs associated with having a crew, cabins, food, storage, life-support, and fuel.

SUMMARY

The present invention may be comprised of modules that provide for one or more of the following: a platform for the connection of solar panels; a landing deck for aerial data gathering system or drone; an underwater ROV docking bay; a spool for a tethering cable; an electrical charging system; a network computer control system; a network data transmission system; two torpedo-shaped or shallow water dual kayak or catamaran shaped hulls, which may also serve as a casing for a propeller-driven propulsion system; housing for energy storage; data collection sensors; a buoyancy ballast control system; and docking for a drone and/or an underwater ROV.

OBJECTS AND ADVANTAGES

The present disclosure can provide a number of advantages depending on the particular aspect, embodiment, and/or configuration. None of the particular objects or advantages that follow must be entirely satisfied as they are non-exclusive alternatives and at least one of the following objects is met; accordingly, several objects and advantages of the present invention are as follows:

to provide educational live streaming and recorded videos; or still photography; from: above, below, and at the surface of the ocean; to classrooms and citizen scientists around the world;

to provide a low-cost means of monitoring and data collection of reef systems to benefit Marine Protected Area (MPA's) managers and coral reef scientists; including ghost net detection and removal;

to providing a method for low-cost surveillance of, and the collection of data for the MPA's and monitoring of fisheries for Illegal, Unreported, and Unregulated (IUU) fishing;

to provide governments and MPA managers with a lower cost method to monitor and protect coral reefs and Exclusive Economic Zone (EEZ) open waters for the purpose of ocean conservation;

to provide enhanced capabilities in observing marine habitat and oceanographic mapping for the purposes of marine conservation;

to provide enhanced capabilities in locating and monitoring submerged cultural resources (historical shipwrecks, etc.) and in search and recovery of lost aircraft or watercraft;

to provide monitoring of existing infrastructure or mapping for planning thereof; and, to provide dive operations and resorts with a means to share live visual of local reefs with their customers, both scuba divers, and non-divers, and thereby assisting in the discovery of new dive sites that provide additional locations for data collection.

The multifaceted energy generation systems of the present invention allow the vessel to carry out missions manned craft are incapable of, whereas the present invention will provide these services at a significantly reduced cost. The craft has the combined capabilities to get the same or similar results as a ship and crew using an underwater ROV and a drone or helicopter without the costs associated with having a crew, cabins, food, storage, life-support, and fuel.

The shape and design of the present invention takes into consideration the effect of the wind that is evenly distributed from every direction with its preferred embodiment of a truncated hexagonal pyramid or truncated cone shape design. These forms take advantage of the naturally energy of the ocean, including: wind, solar, wave action, and currents by leveraging the ships design with its environment.

The present invention also supports retrofitting the craft in a different configuration using multiple components for mission specific requirements or adaptations thus taking advantage of geological variations and conditions, using modular apparatus that perform a variety of tasks. These optional modules may include but are not limited to, wind generators, RF antenna, additional cameras, atmospheric and oceanic sensors, or other data collection devices. Such modules could be deployed individually or in combinations for applications that would benefit from additional sensors and mechanical apparatus. Such as a 3D imagery and LiDAR capturing systems using multiple cameras placed at precise locations in order to produce desired results.

These and other objectives and advantages of the present invention will become more apparent from the following description taken in conjunction with the accompanying drawings wherein are set forth, by way of illustration and example, certain embodiments of the instant invention. The drawings are intended to constitute a part of this specification and include exemplary embodiments of the present invention and illustrate various objects and features thereof.

BRIEF DESCRIPTION OF THE DRAWINGS

Various embodiments are described herein with reference to the following Drawings Certain aspects of the Drawings are depicted in a simplified way for reason of clarity. Not all alternatives and options are shown in the Drawings and, therefore, the Claims are not limited in scope to the content of the Drawings.

1. Figures

Figure 1:
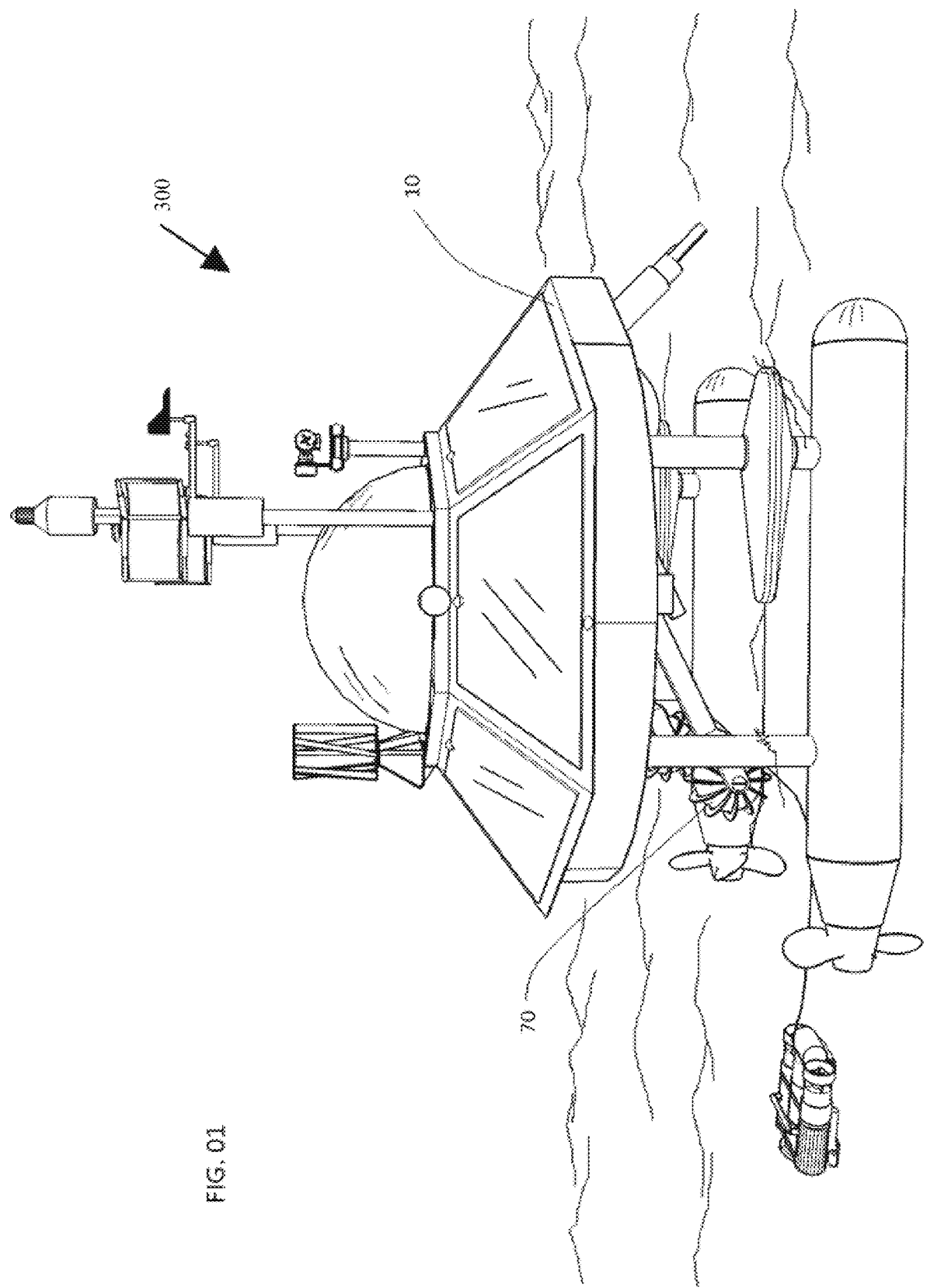
FIG. 01 Illustrates a starboard elevation of a vessel, in accordance with an embodiment of the present disclosure.
Figure 2:
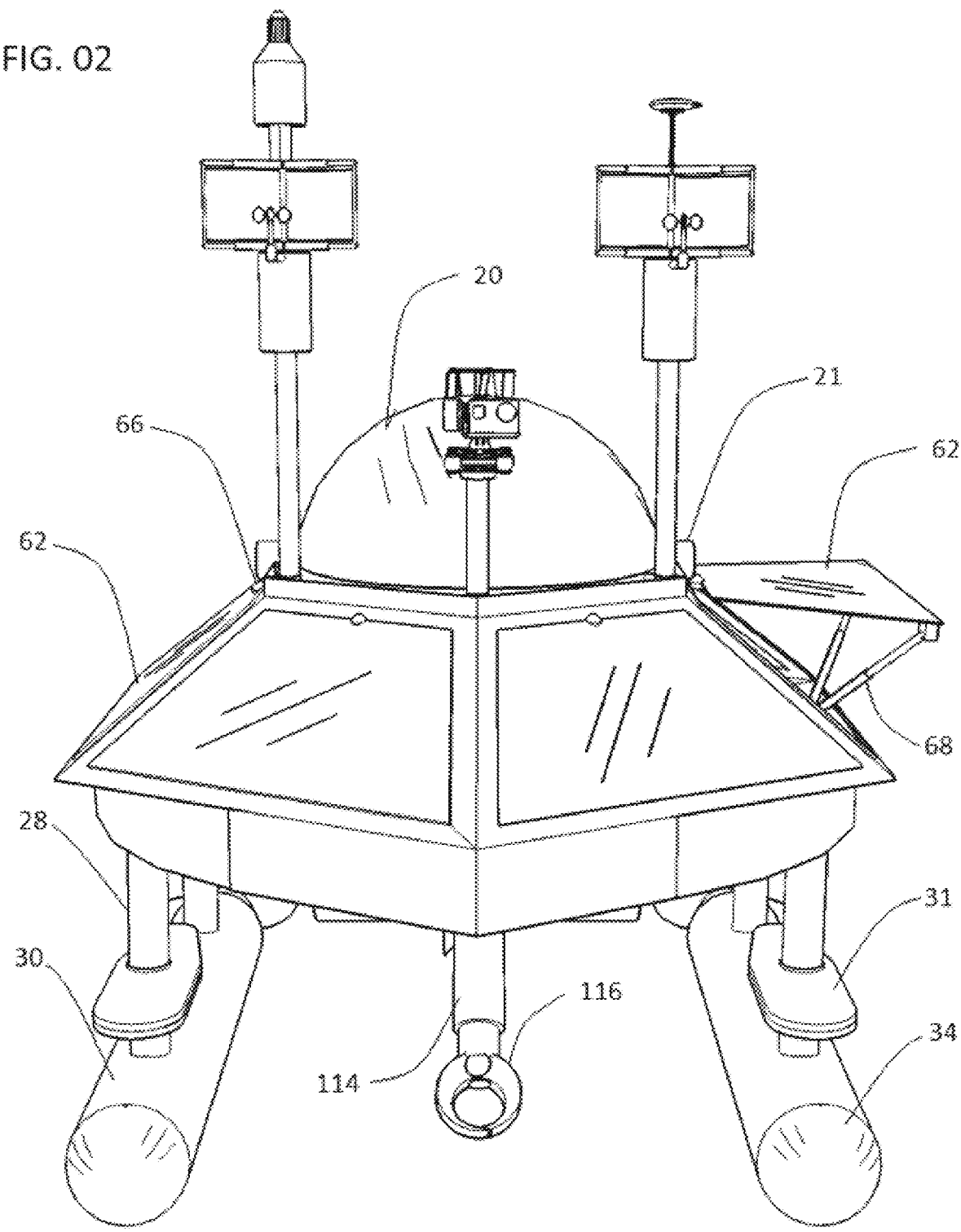
FIG. 02 Illustrates a bow elevation of a vessel, in accordance with an embodiment of the present disclosure.
Figure 3:
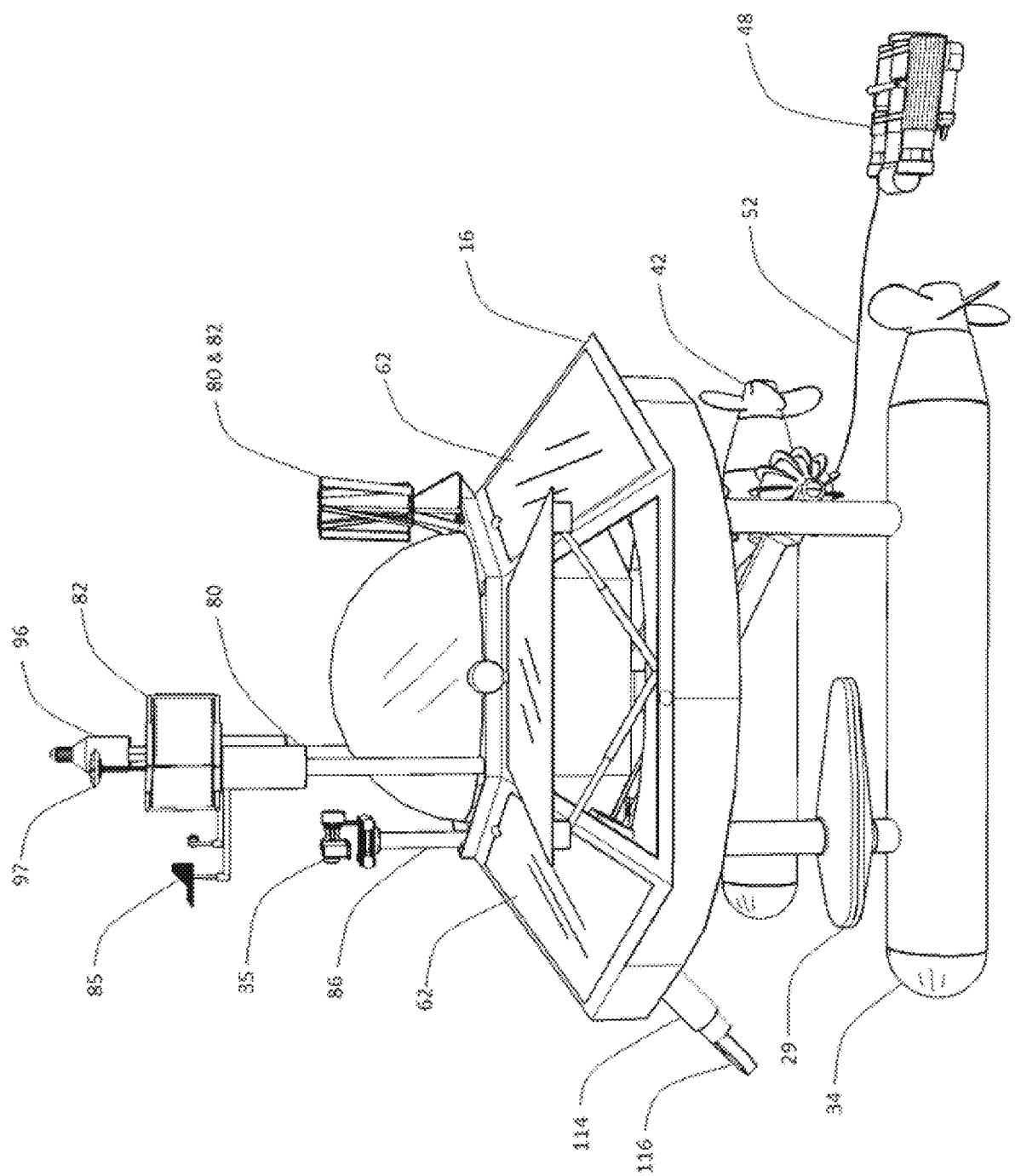
FIG. 03 Illustrates a port side elevation of a vessel, in accordance with an embodiment of the present disclosure.
Figure 4:
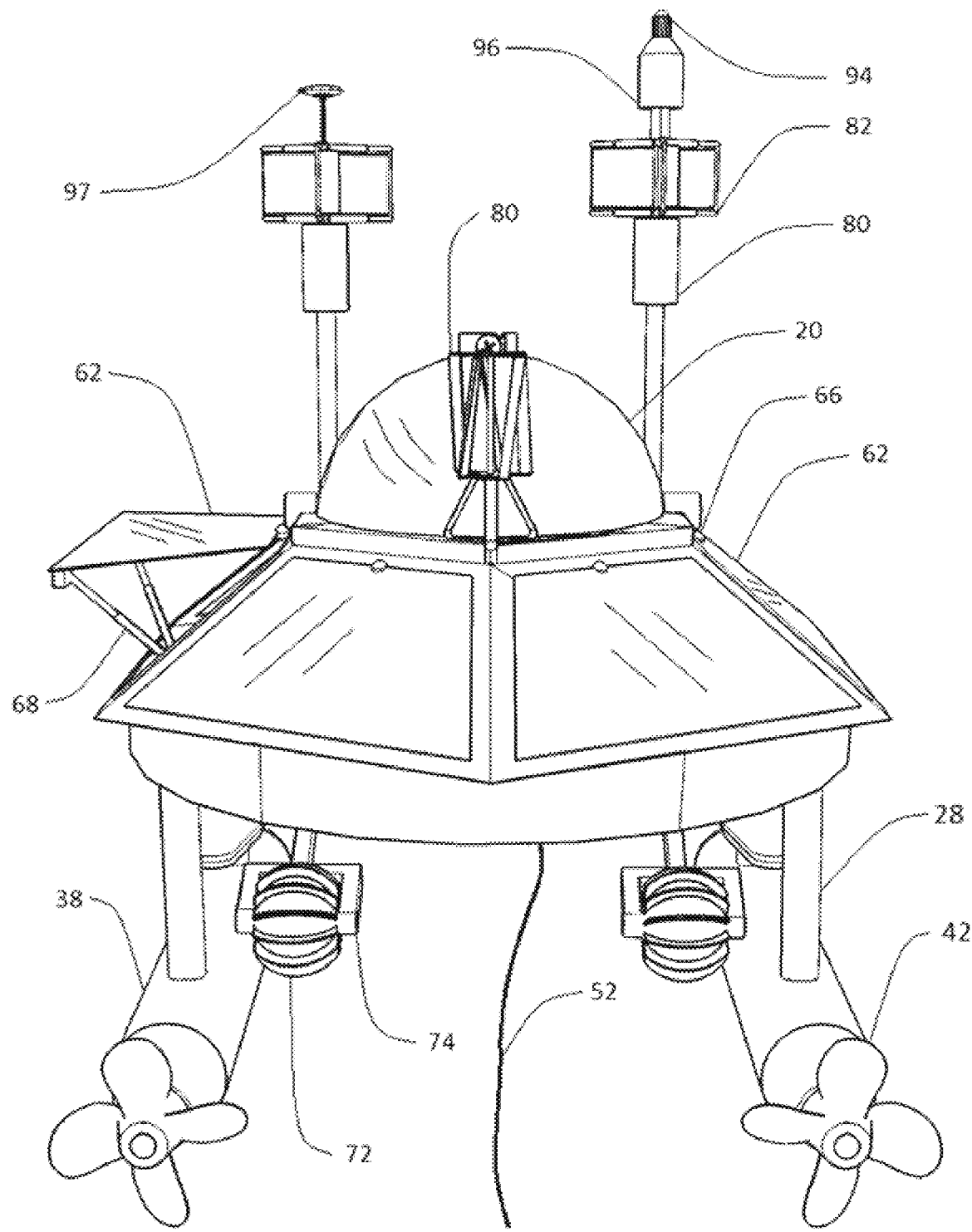
FIG. 04 Illustrates a stern elevation of a vessel, in accordance with an embodiment of the present disclosure.
Figure 5:
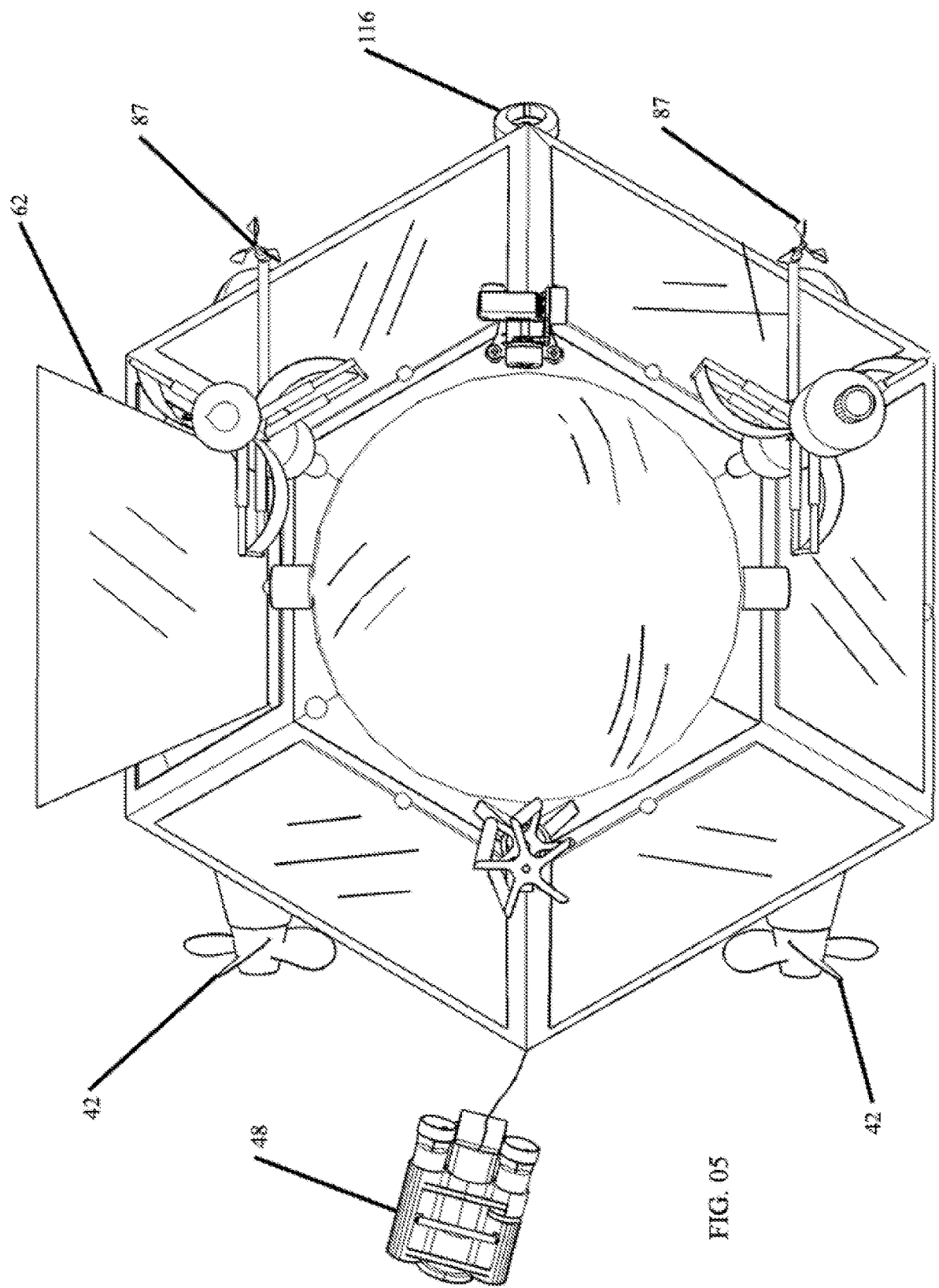
FIG. 05 Illustrates a top view of a vessel, in accordance with an embodiment of the present disclosure.
Figure 6:
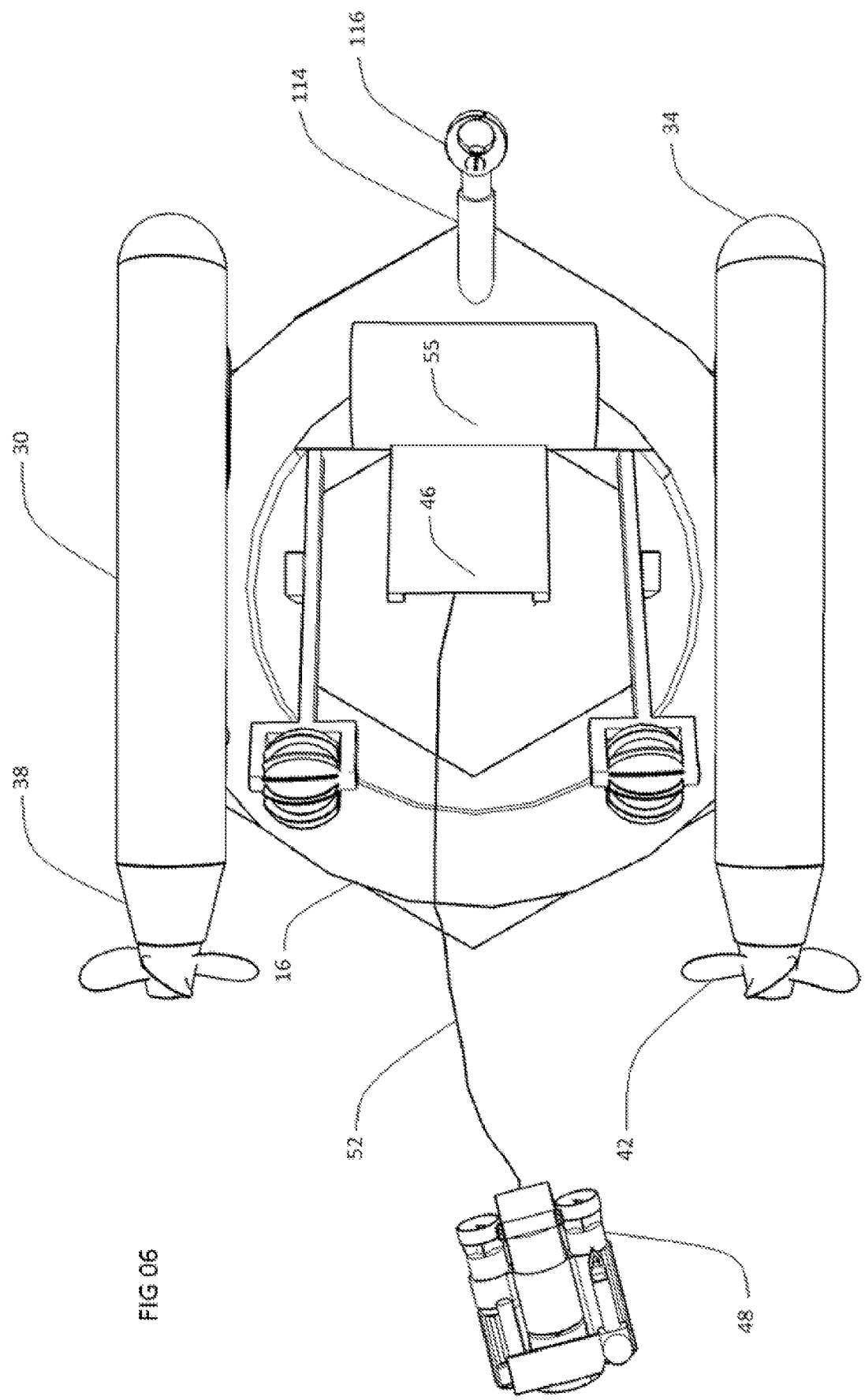
FIG. 06 Illustrates a bottom view of a vessel, in accordance with an embodiment of the present disclosure.

Corresponding reference characters indicate corresponding components throughout the several figures of the Drawings. Elements in the several figures are illustrated for simplicity and clarity and have not necessarily been drawn to scale. For example, the dimensions of some of the elements in the figures may be emphasized relative to other elements for facilitating understanding of the various presently disclosed embodiments. Also, common, but well-understood elements that are useful or necessary in commercially feasible embodiment are often not depicted in order to facilitate a less obstructed view of these various embodiments of the present disclosure.

DETAILED DESCRIPTION

The following description is not to be taken in a limiting sense, but is made merely for the purpose of describing the general principles of exemplary embodiments, many additional embodiments of this invention are possible. It is understood that no limitation of the scope of the invention is thereby intended. The scope of the disclosure should be determined with reference to the Claims. Reference throughout this specification to "one embodiment," "an embodiment," or similar language means that a particular feature, structure, or characteristic that is described in connection with the embodiment is included in at least one embodiment of the present disclosure. Thus, appearances of the phrases "in one embodiment," "in an embodiment," and similar language throughout this specification may, but do not necessarily, all refer to the same embodiment.

Unless otherwise indicated, the drawings are intended to be read (e.g., arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate. Also, as used herein, terms such as "positioned on" or "supported on" mean positioned or supported on but not necessarily in direct contact with the surface.

The phrases "at least one," "one or more," and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. The terms "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

In the: Summary, the Detailed Description, and FIGS. 01-20, reference is made to particular details and features of the invention and to their function that is to be understood to describe only one embodiment of many possible embodiments. When particular characteristics are stated in one context, it is understood that these features might vary in context with other applications, and in all other aspects of the invention.

Figure 7:
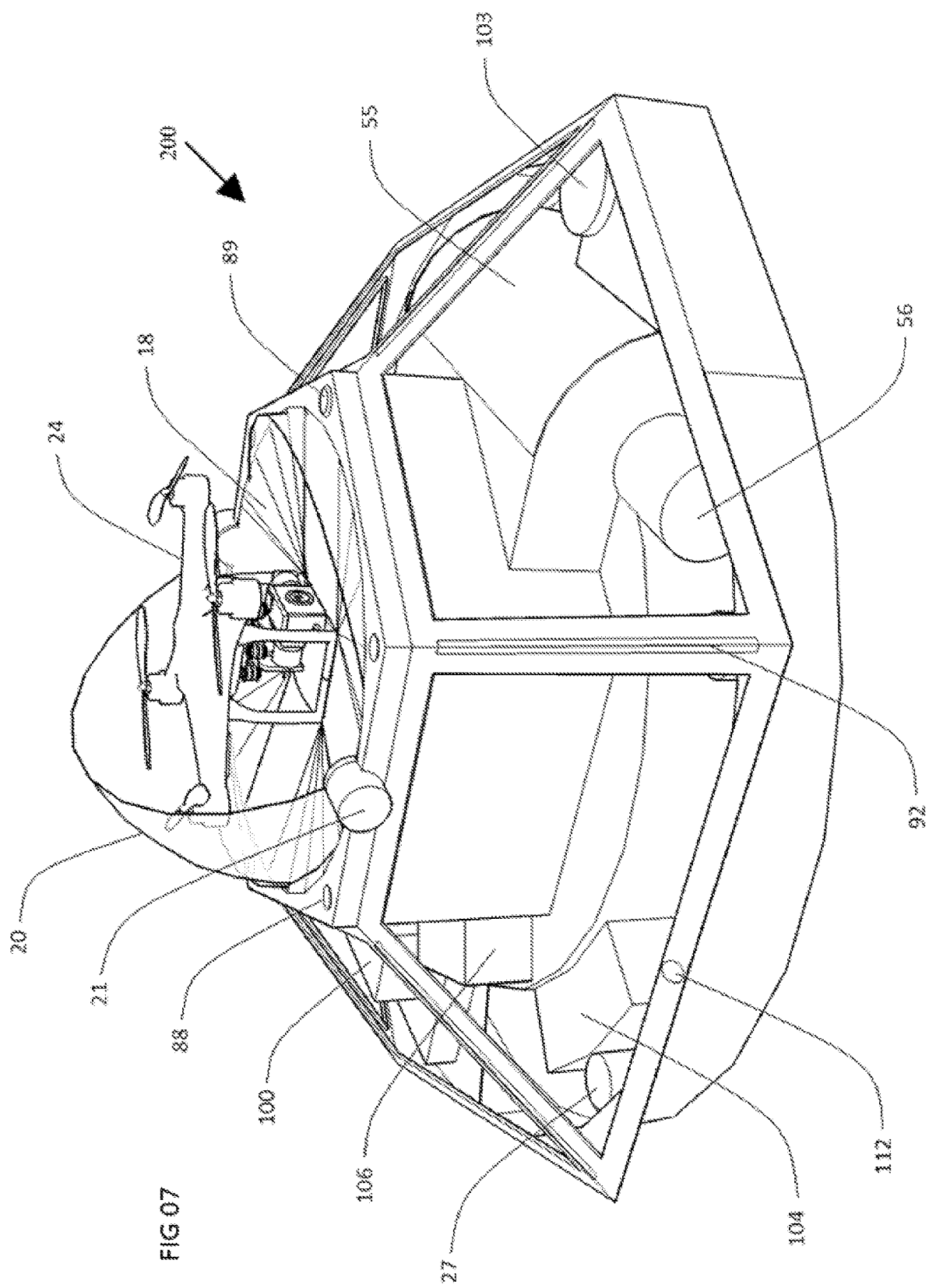
FIG. 07 Illustrates a bow-starboard interior perspective cutaway view of a frame and interior components of a vessel, in accordance with an embodiment of the present disclosure.

A general description will now be made of a vessel (300) with more specific explanations of different aspects of the vessel to follow. FIGS. 01-20 of the drawings show several unique modular components that may be retrofitted into plug-in ports (88), which are located on the upper module (200) of the vessel, as seen in FIG. 07; the upper module is the portion of the vessel (300) that is typically out of the water. The upper module (200) may generally have the shape of a truncated hexagonal pyramid or a cone. Such upper module may connect to various other modules, such as: a tower extension module (86) that extends and supports a wind-powered energy collection system (80); a wind speed (85) data gathering system; a direction data gathering system (87); multiple sensor systems (84) (represented looking like camera in drawings) such as a camera or a 3D imaging system or LiDAR; a GPS/SatFi antenna (96); and a WiFi antenna (97); all of which may be connected or networked to one or more: computers systems (102), electrical controlling systems, charging circuit systems (106), energy storage system batteries (104), and telemetry and transmission systems.

The upper module (200) of the vessel (300) may also comprise: a motorized tether spool (54) that holds a tether cable (52) connected to a underwater remote operated vehicle or "ROV" (48). Attached to the underside the vehicle may be a wave action capture systems (70) comprised of one, two, or more spherical electric generators that may be connected to a tuning fork-shaped lever (74) that works in concert with a linear generator (69) on a central axis. This wave action capture system (70) is designed to capture the up and down wave energy of movement of the water underneath the craft which stands above the water and doesn't move up and down with the waves due the SWATH design of the hull used in this embodiment.

As seen in FIG. 01, the vessel may have a small waterplane area twin hull exterior shape, better known by the acronym "SWATH". A SWATH vessel (12) may have multiple configurations such as torpedoes, a kayak, that of a Catamaran (14); or alternative embodiments based on the intended application. Furthermore, the size and scale of such a vessel may vary based on the intended applications, such as: the data to be collected, geographic location, or other requirements.

In a preferred embodiment of the vessel it is a Data Transmitting Marine Vessel System also known as a "DRT-MEVS" (10) based on SWATH vessel (12) hull designs or alternately that of a Catamaran vessel (14) having two or more distinct separate connected sections, but not limited to those shapes for the vessel, with one or more landing decks (18) and an upper outer shell module (16). Inside the upper outer shell module (16) may be an internal systems compartment (98) that could house multiple computer systems (102) that manage and control one or more of the following components and systems: energy storage systems such as batteries (104), alternate fuel cells, or other means for storing energy generated by one or more components of the power generation systems described herein. The multiple computer system (102) can be programmed to deliver the vessel to any location on any body of water using GPS guidance thru a GPS/SatFi antenna (96) in concert with a geomagnetic device or compass and a GPS deciphering system (100) to determine coordinates, via satellite signal (118). The multiple computers system (102) may have proprietary software that can send signals to a propeller-driven propulsion system (38) that may operate bi-directional electric motors (40) on a shaft thru a watertight shaft seal to marine propellers giving them rotation producing locomotive thrust to move the vessel to a desired location.

The vessel may have a propulsion system that is propelled by a motorized system consisting of, but not limited to, one or more bi-directional electric motors (40) and driving marine propellers (42). Such motors may be powered by energy storage system batteries (104) charged through a charging circuit system (106); including, but not limited to; components that have the nature of: inverters, inductors, transistors, resistors, capacitors, rectifiers, diodes, and circuit boards; and possibly charged through a combination of one or more of the following: a solar energy collection system (62), a wind-powered energy collection system (80), a wave energy capture systems (70), and an ocean current energy capture device such as a rotating finned spherical electric generator (72).

A rotating finned spherical electric generator (72) may be attached on one end of a tuning fork-shaped lever (74) with a linear generator (69) on the other end producing an electrical AC or DC+/−current from the up and down motion of the waves and the rotation of the sphere from the current beneath the vessel, on the other end. The shell of the finned sphere shell (73) would be optimally constructed in two halves allowing the assembly of internal components contained inside the waterproof sphere, including an array of magnets (76) attached to the outer layer of the inside of the sphere that could rotate around a fixed armature (78) to produce an AC or DC current with +/−contacts connected by wiring to a charging circuit system (106). Energy storage system batteries (104) could also be pre-charged from a land-based electrical grid (120) prior to utilization. In the preferred embodiment, there is an optional onboard cooling system (108) using seawater and/or an air fan (110) to provide said cooling. The vessel may also contain an anchoring system for shallow water exploration where mooring buoys are unavailable. The vessel would be compliant with international small vessel standards with port and starboard lighting (112) as well as other required lighting.

In the preferred embodiment illustrated in FIGS. 01-04 all the inclined upward pitched sections of the upper module (200) may be covered with a solar energy collection system (62) that may comprise animatronic systems capable of changing the angle of solar panels in a solar energy collection system (62) to maximize exposure to the sun for efficiency. By way of example in FIGS. 02-04 this could be accomplished by using a ball or other swivel joint (66) at the top of the panels of such solar energy collection system (64) which may be connected to two or more panel actuators (68) at the bottom of such panel(s) that can extend from the lower edge of such panel(s) in conjunction with the ball swivel joint (66) by extending—thereby changing its angle relative to the location of the sun.

The vessel may further comprise one or more servo activated extending grapples (114) or gaffs with actuated claws (116) attached to the bow of vessel (12) that may be actuated using a motor; such as a gear motor; that can actuate the claw to grasp a rope, chain or other attachment, possibly provided by a mooring buoy or dock to hold the vessel in a relatively static position. Once the vessel has been attached to a buoy, dock, or anchorage, an aerial data gathering system (24) and/or the underwater ROV data gathering system (48) may be more safely deployed and programmed to navigate back to the vessel following its pre-programmed or remote-controlled data collection tasks. Additional extending grapples and claws may grasp one or more additional ropes or chains attached to the buoy to further minimize radial drift about a buoy.

Anchoring the craft to a mooring buoy would also enable a spherical buoyant wave energy capture systems (70) to move up and down by harvesting waves energy, producing an up and down motion of the sphere. This wave motion can then be transferred to the other end of a swiveling fork (74) on an axis that moves a permanent array of magnets up and down thru an insulated U-shaped chamber (75) moving a magnet through a curved linear generator coils armature to produce electricity for the charging circuit system (106). This design is highly efficient because the SWATH (12) or catamarans (14) design have stability in the water by letting waves pass thru the hull "like a bridge," that allows for more significant height differentiation between the vessel and the top of the waves, which can multiply the amount of harvested wave energy captured.

Figure 17:
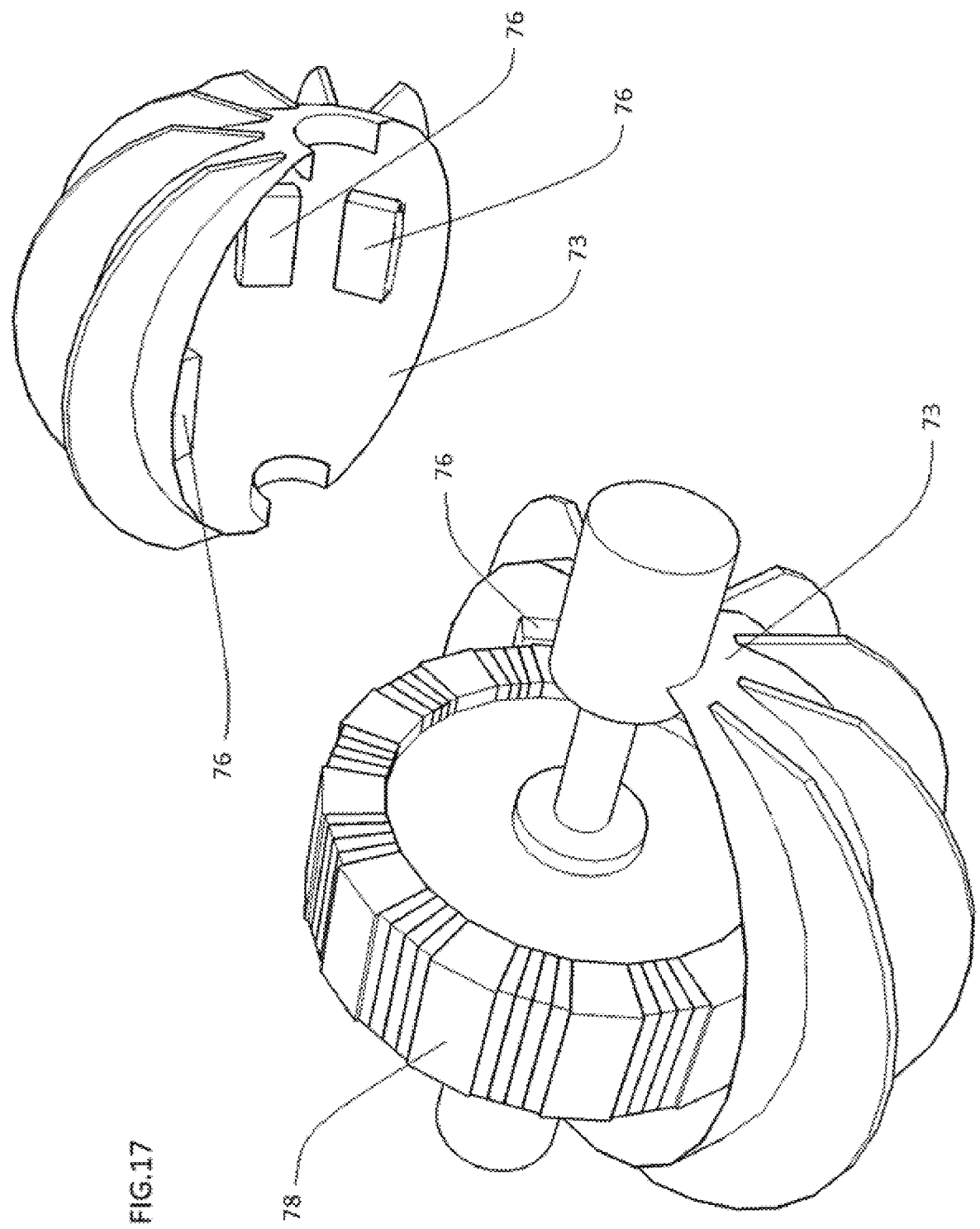
FIG. 17 Illustrates an exploded view of a finned spherical generator, fixed armature coils, and magnets of an array of a vessel; in accordance with an embodiment of the present disclosure.
Figure 18:
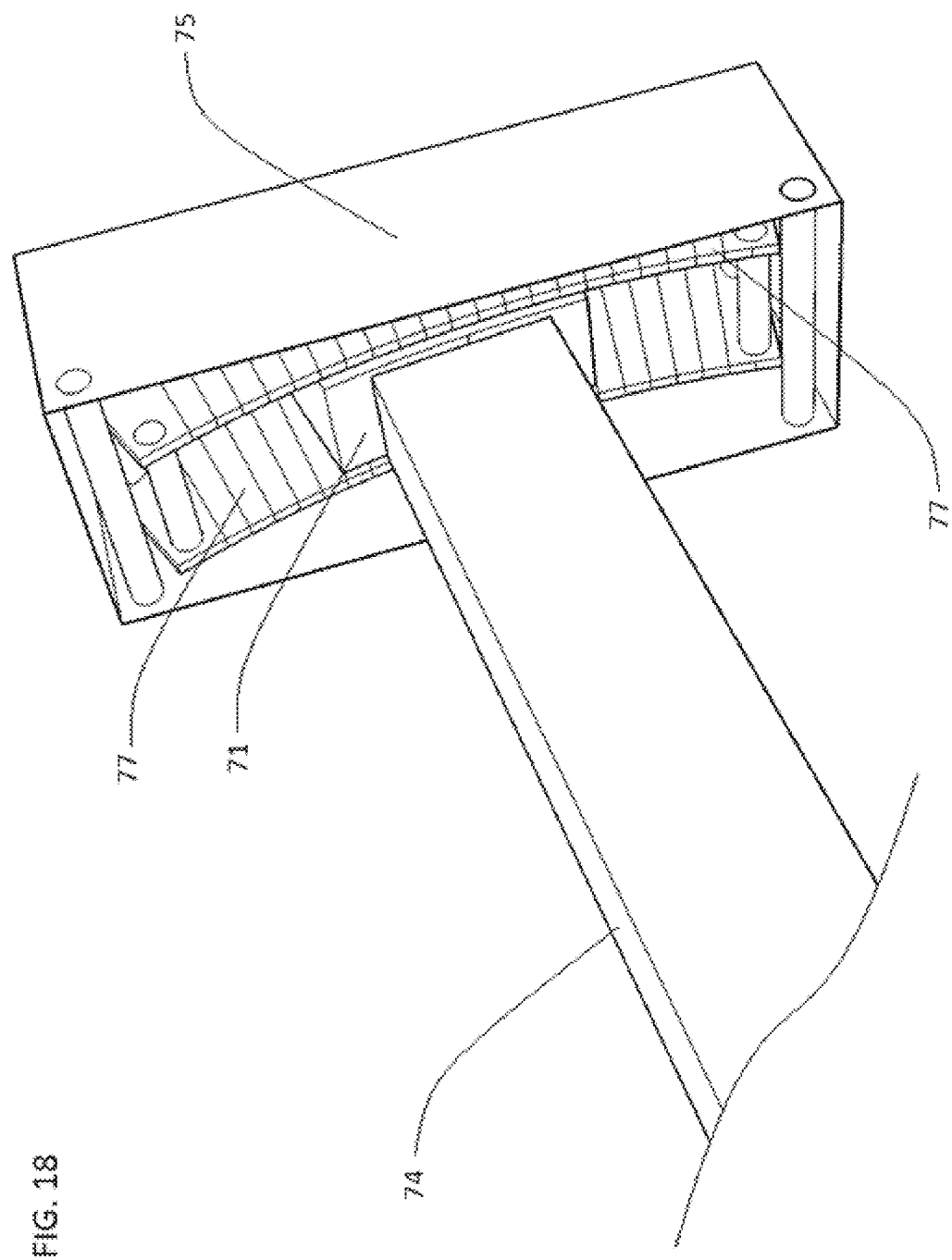
FIG. 18 Illustrates a view of a curved linear generator housing of a vessel, in accordance with an embodiment of the present disclosure.
Figure 19:
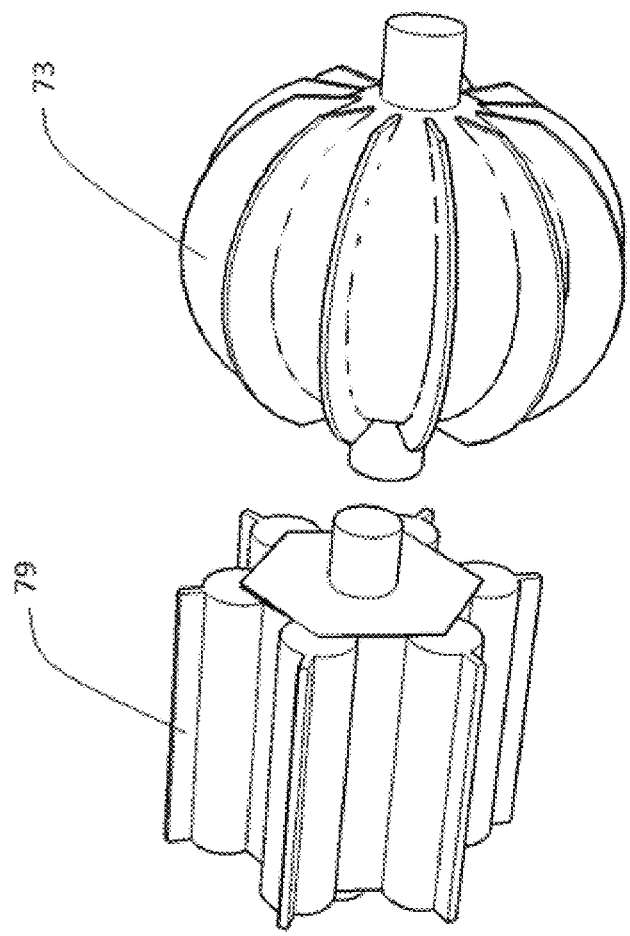
FIG. 19 Illustrates a view of an optional paddle wheel design for a spherical electric generator pontoon, in accordance with an embodiment of the present disclosure.
Figure 20:
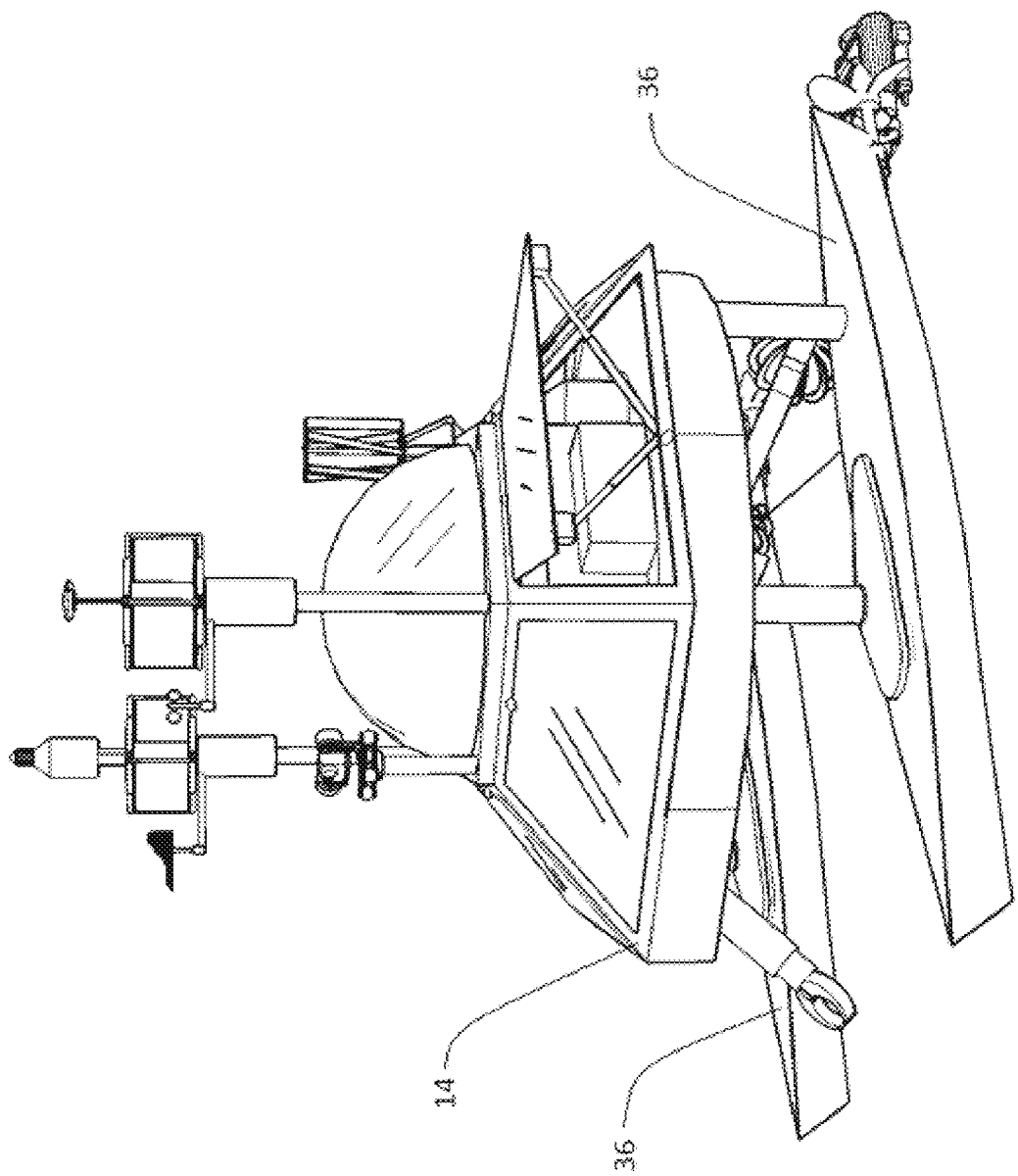
FIG. 20 Illustrates a perspective view of a catamaran option for a vessel, in accordance with an embodiment of the present disclosure.

As shown in FIG. 17, a finned rotating spherical electric generator (72) may also be provided to produce electrical energy by utilizing water currents to push the fins thereby causing rotation of a sphere having an array of magnets around the fixed armature (78) to yield an electrical current, thereby adding to the overall electrical production.

Figure 8:
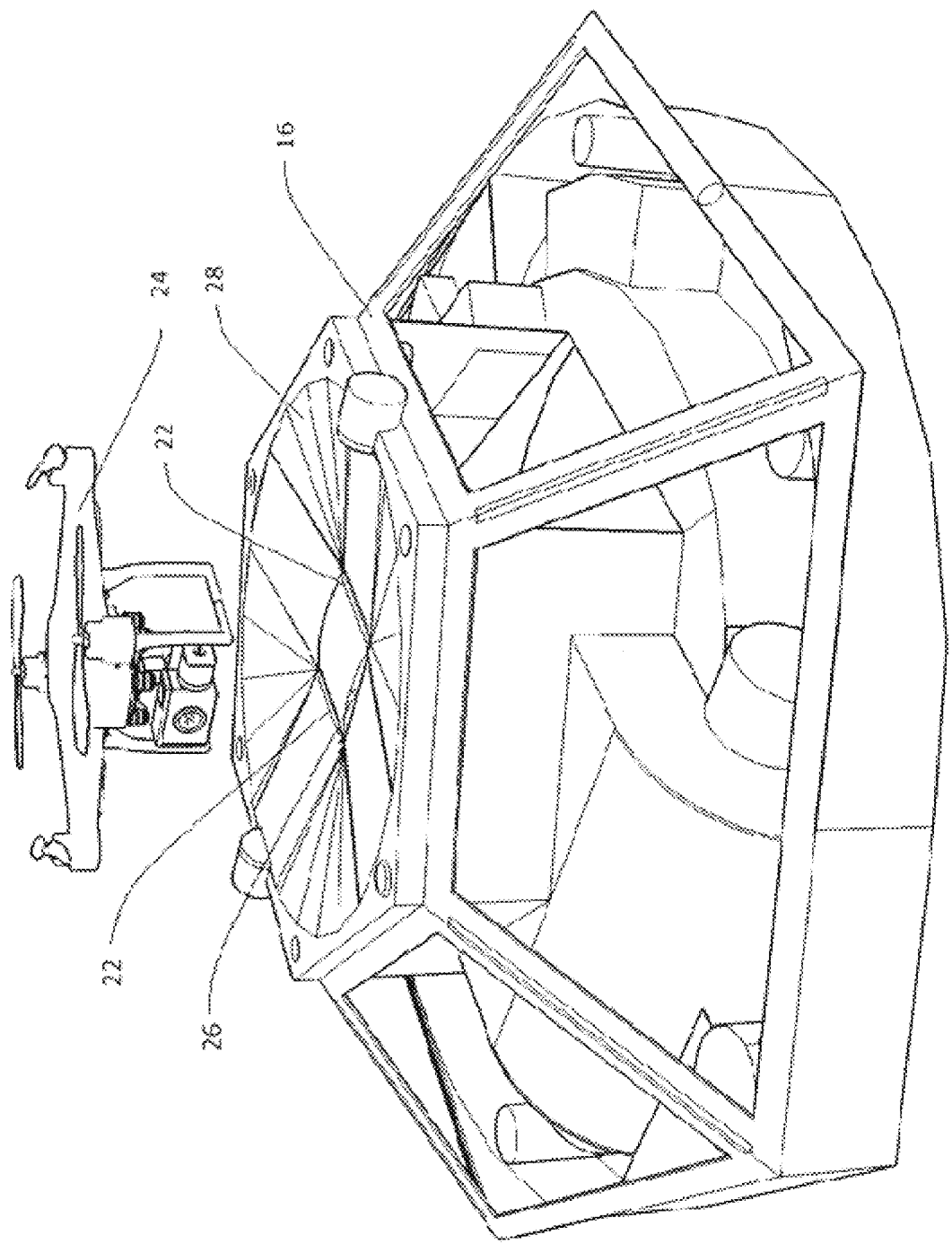
FIG. 08 Illustrates a landing deck and a drone, in accordance with an embodiment of the present disclosure.
Figure 9:
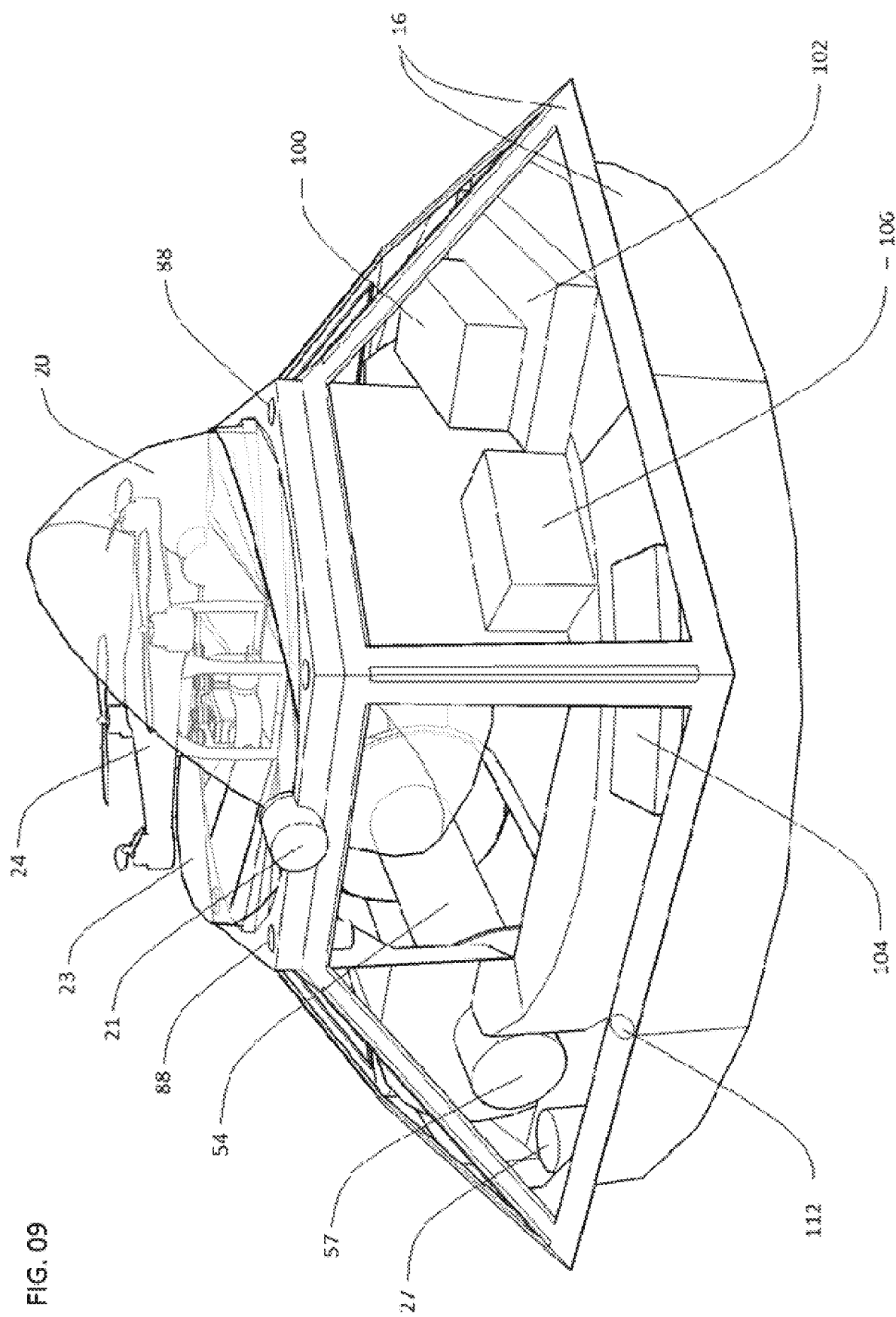
FIG. 09 Illustrates a port-stern interior perspective view of a vessel, in accordance with an embodiment of the present disclosure.
Figure 10:
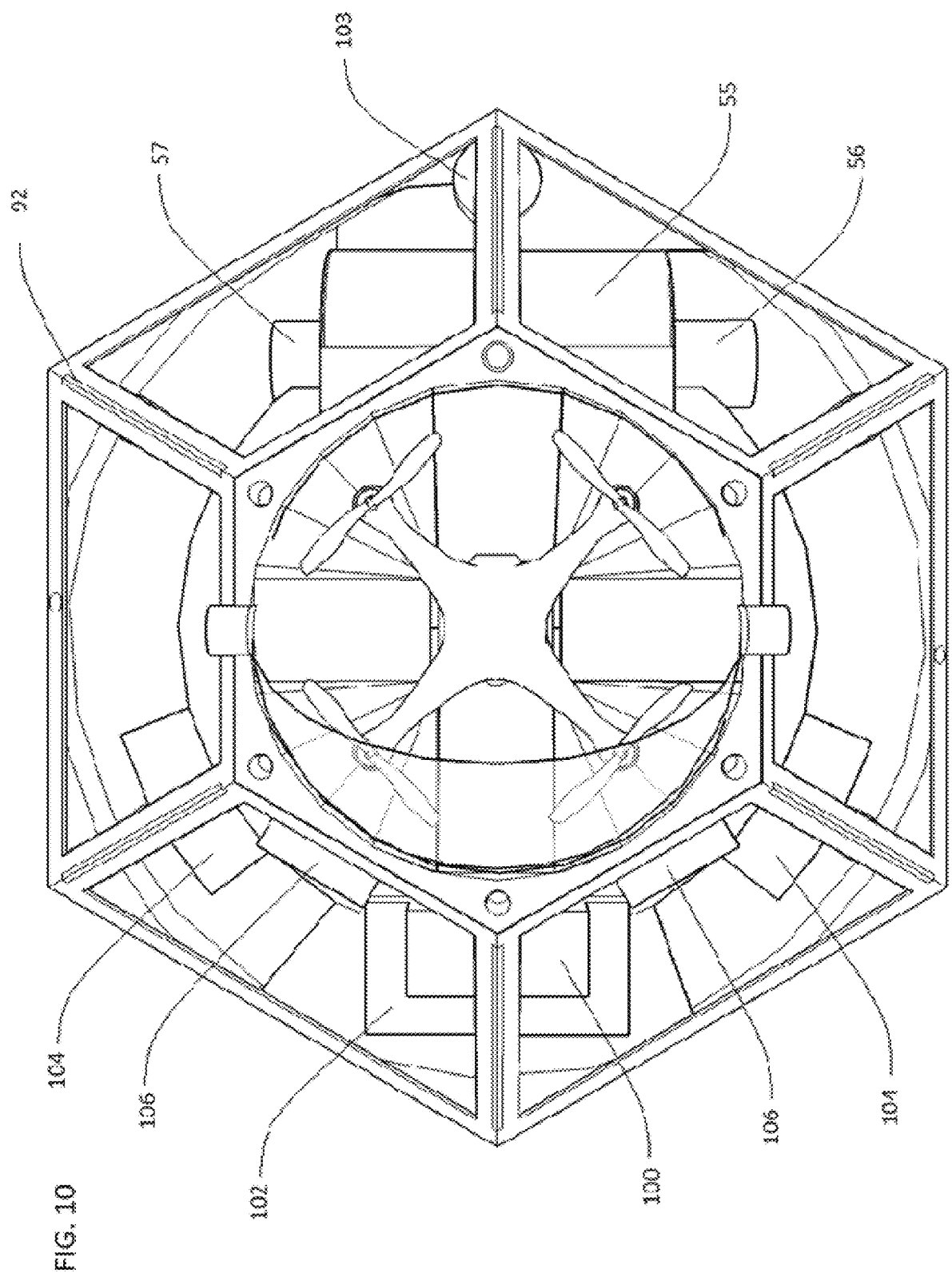
FIG. 10 Illustrates a top cut-away interior view of a vessel, in accordance with an embodiment of the present disclosure.
Figure 11:
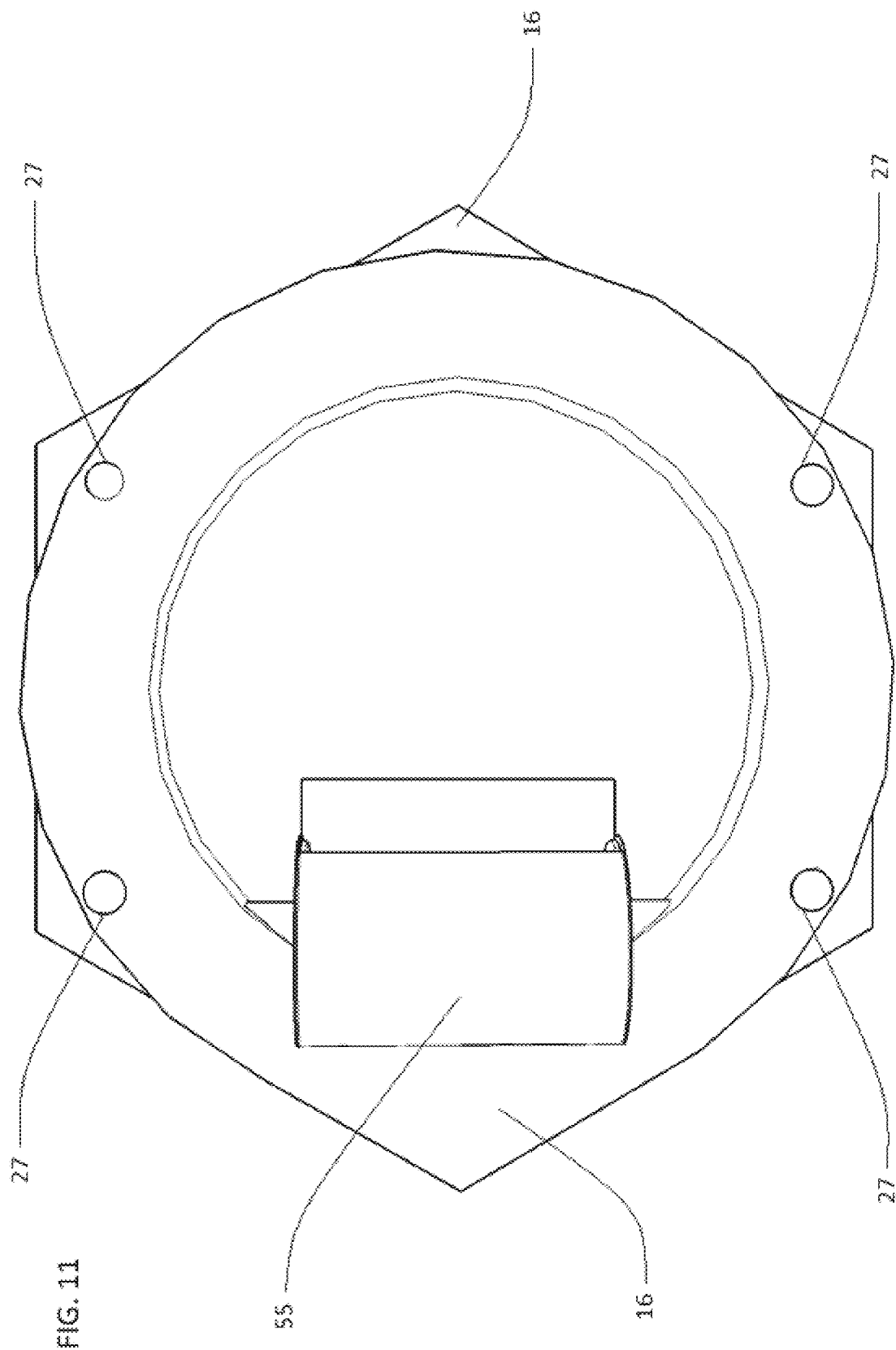
FIG. 11 Illustrates a bottom cut-away interior of a vessel, in accordance with an embodiment of the present disclosure.
Figure 12:
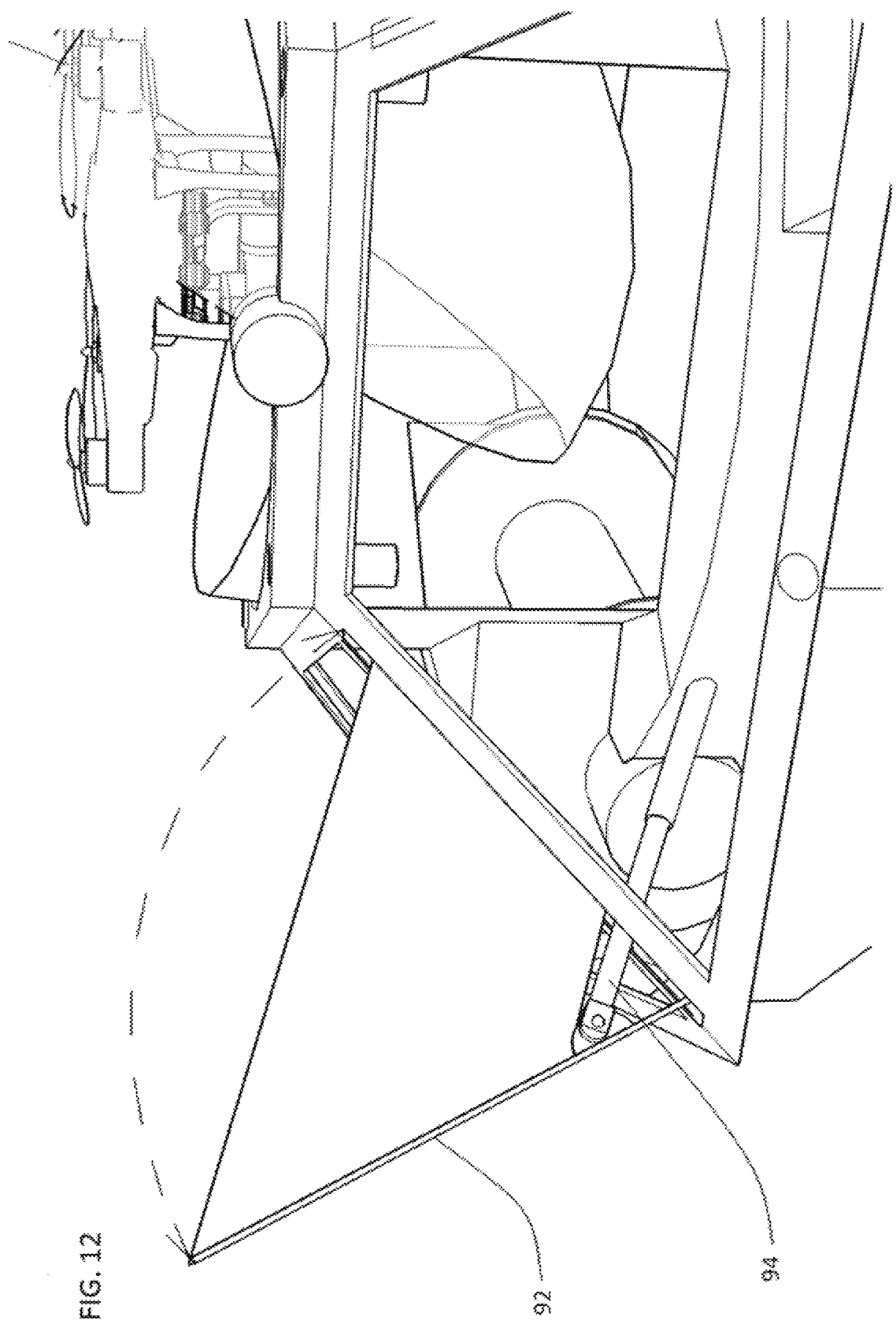
FIG. 12 Illustrates an upper half cut-away view of a vessel with a sail, in accordance with an embodiment of the present disclosure.
Figure 13:
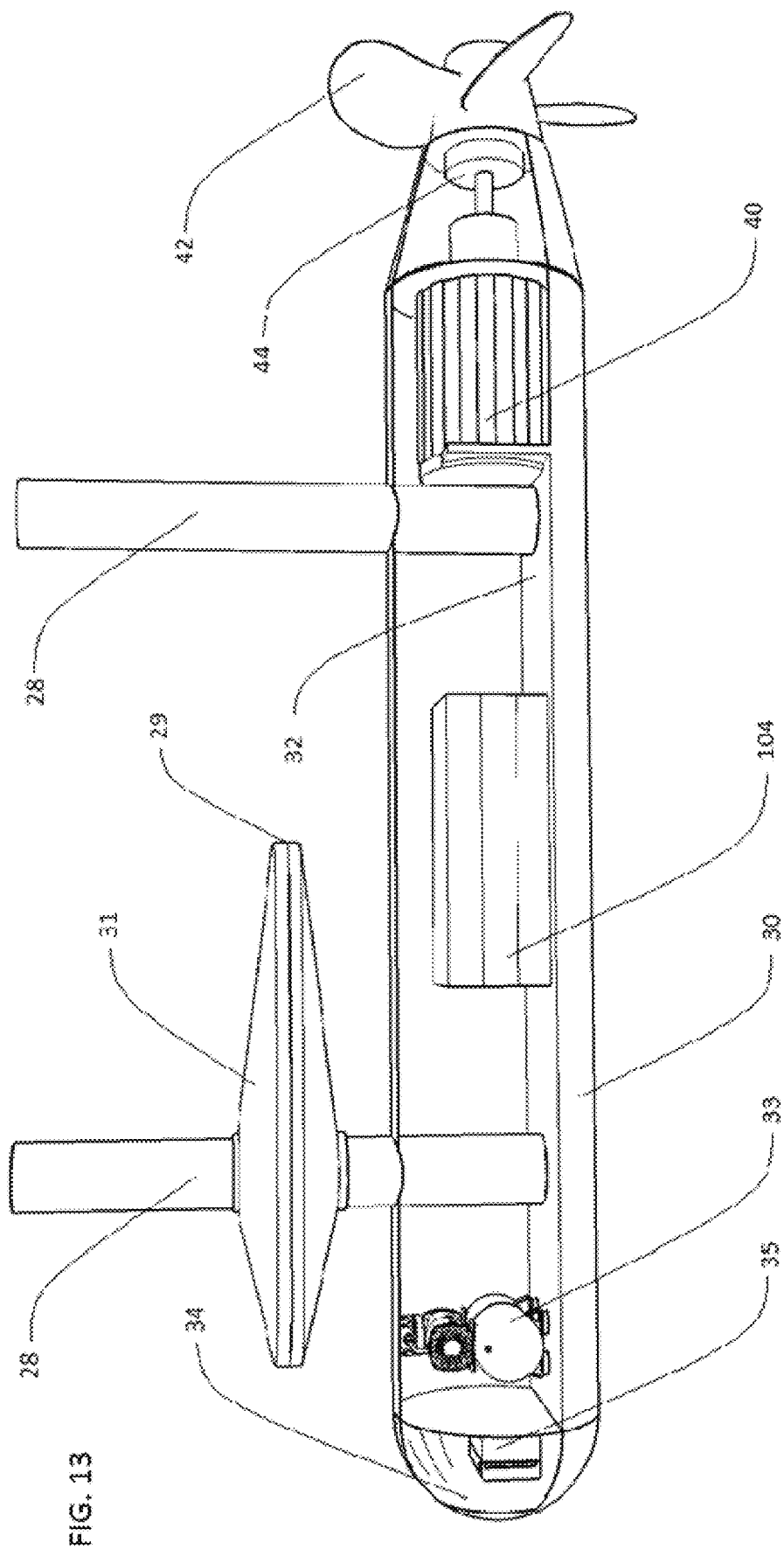
FIG. 13 Illustrates a cut-away port side view of propeller-driven propulsion system, in accordance with an embodiment of the present disclosure.
Figure 14:
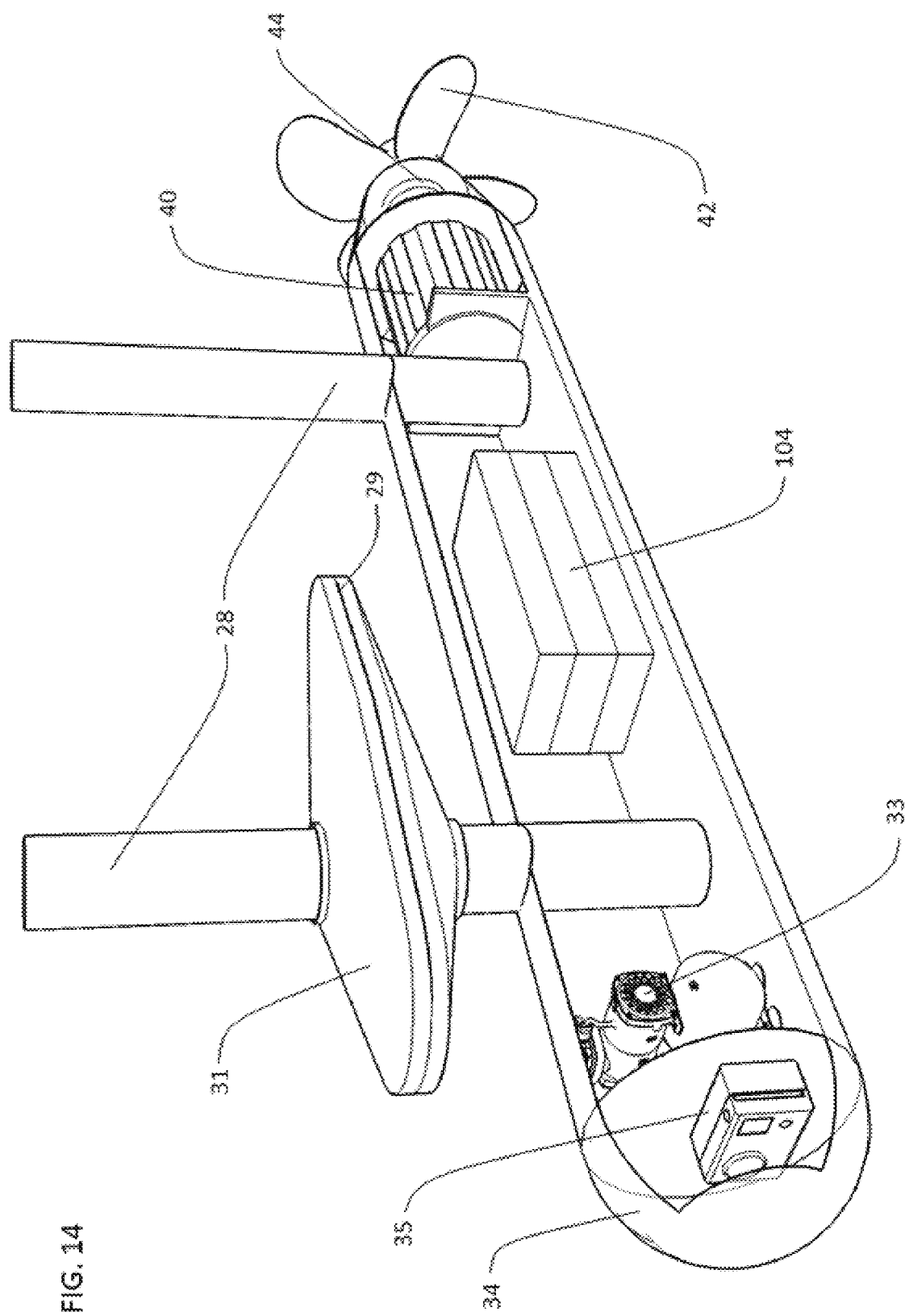
FIG. 14 Illustrates a cut-away bow perspective view of the internal components of a pontoon, in accordance with an embodiment of the present disclosure.
Figure 15:
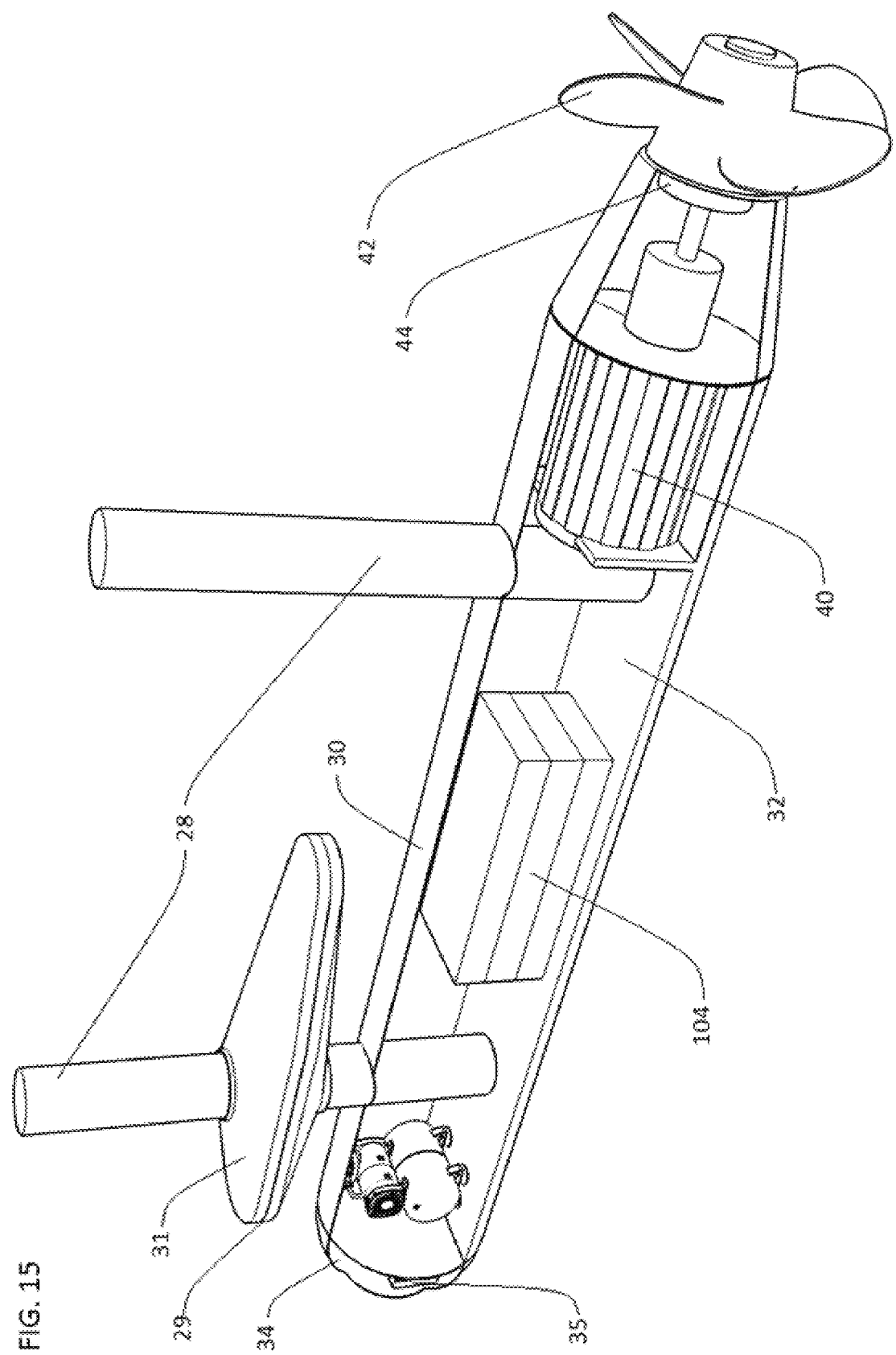
FIG. 15 Illustrates a cut-away stern perspective view of internal components of a pontoon, in accordance with an embodiment of the present disclosure.
Figure 16:
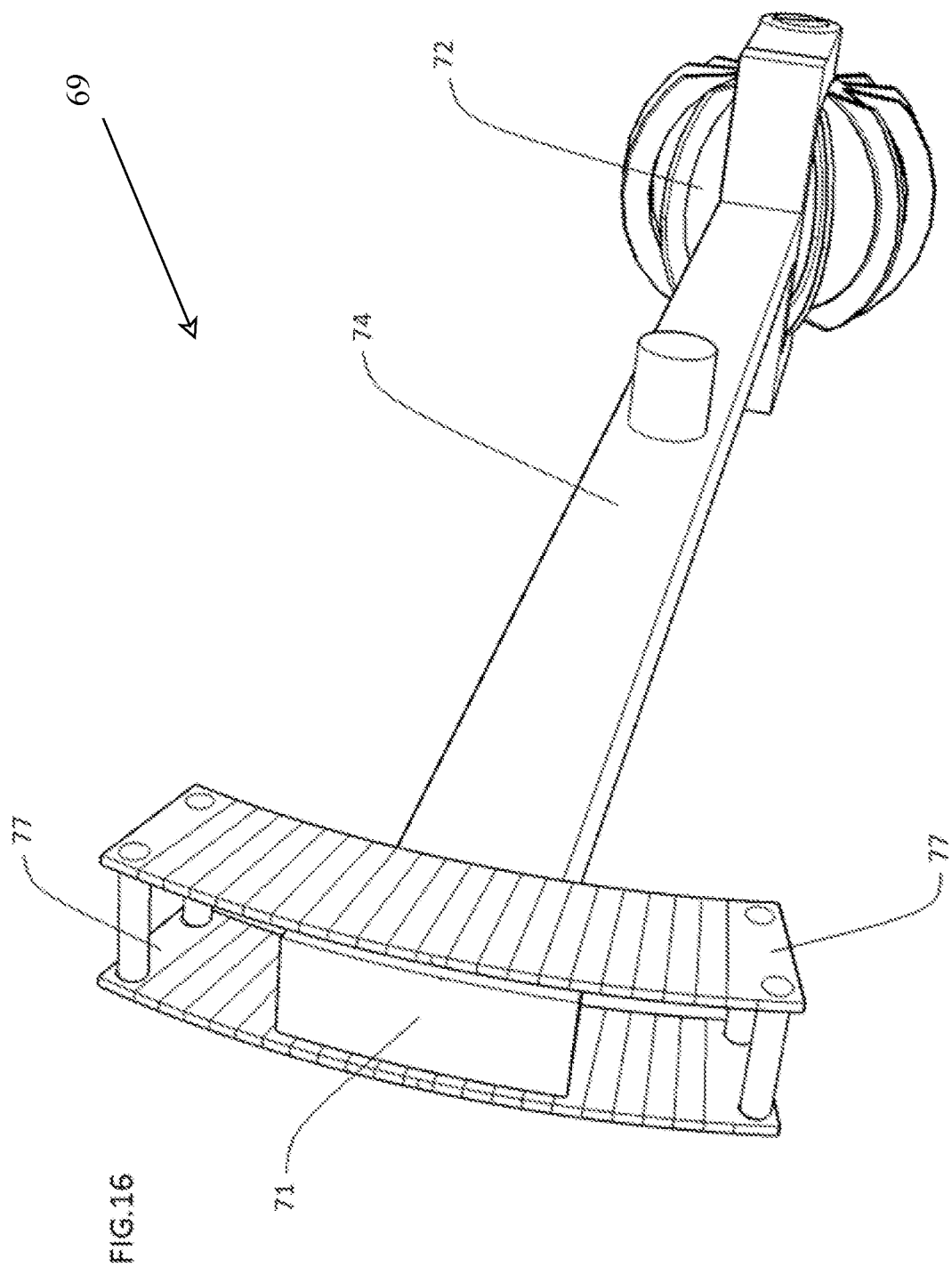
FIG. 16 Illustrates a view of a wave energy capture system of a vessel, in accordance with an embodiment of the present disclosure.

As shown in FIG. 08, in a preferred embodiment of the invention, the auto-aligning landing deck (18) above the solar energy collection system (62) and surrounding the aerial data gathering system and said landing deck (18) may also provide up to six locations at the top of the hexagon shape. Such locations may be configured with one or more plug-in ports (88) for connecting different modular components; including, but not limited to: a specialized sensor systems (84); a wind-powered energy collection system (80); a gimbal or otherwise mounted cameras on tower extensions masts (86), such as: 3D, LiDAR, night vision, 360 degree, thermal, ultrasonic; or other devices for capturing electromagnetic frequencies and data of different natures.

Referring now to FIGS. 01 and 13-15; the preferred embodiment of the SWATH (12) or optional Catamaran/Trimaran (14) design may comprise the design of a dual torpedo-shaped hulls (30) or optional kayak shaped hulls (36) with propeller-driven propulsion system(s) (38) that may be driven by bi-directional electric motors (40) with a drive shaft (41) thru a watertight shaft seal (44) to rotate the marine propellers (42). The lower torpedo-shaped hull (30) modules of the vessel may supports the upper vessel (10) module with one or more vertical spars (28) mechanically connecting and supporting the top half of the surface support vessel above, and provide a conduit for systems to share: ventilation air, electrical energy, data, and control signals; similar designs have been used by the U.S. Navy for years.

The use of the SWATH hull design in this detailed description allows waves to pass thru the hull of the FIG. 01 vessel (10) such that it provides a much more stable landing platform for a drone, by virtue of the lack of conductance of wave energy to the upper module (200). Additionally, use of a SWATH hull provides a more significant differential in the movement of the ship on the water resulting in improved energy generation from floating wave energy capture systems (70) by harvesting wave energy in the present invention, versus a ship using standard hull design.

The volume of water displaced by torpedo-shaped hulls (30) may be used to produce buoyancy to support the vessel above the water, including the upper outer shell module (16). The volume of the torpedo-shaped hulls may vary with the necessity to support the upper module based on variations in weight requirements. The upper module (200) may also comprise an auto-aligning landing deck (18) section of the vessel and additional internal and external components. The vessel may include one or more methods to control the buoyancy system such as: an active ballast controlled by compressed air provided by mini air compressor (33) to allow or displace water into a ballast compartment (32); and/or a mechanical weighting system; or any combination of both or other buoyancy control systems. The active stabilizing pontoons (31) may provide stability for the vessel by adjusting automatically to a waterline by sliding up and down on a vertical support strut (28) to control the tendency of the bow of the vessel to pitch downward when locomotive thrust is applied to the propulsion system. In a preferred embodiment, torpedo-shaped hulls (30) further comprise one or more energy storage system batteries (104) and an active or retrofitted ballast system (32) that can control buoyancy for different payloads and/or variations in water density or desired water level.

The craft may further comprise a transparent acrylic nose cone dome (34) on the torpedo-shaped hull (30) that can optionally support sensors, cameras, or other robotic devices to augment the vessel's capability for data gathering.

The vessel may comprise an aerial data gathering system (24) and landing deck. The landing deck (18) on top of the upper module is provided to maintain an aerial data gathering system (24) or aerial drone and may be auto-aligning. One or more systems that allow remote operation of the aerial data gathering system (24) or aerial drone and gather data from it are aboard the vessel and may be relayed or controlled from there by a user. The deck preferably includes a signaling device configured to emit a home base signal to provide an aerial data gathering system (24) such as a drone to significantly enhance successful navigation of such systems (24) to the landing deck. In a preferred embodiment, an auto-aligning landing deck (18) would be sloped as to guide a drone to the center of the deck and align it with an electrical conductor's couplers (22) enabling said drone to recharge its batteries. The acrylic protective dome (20) would be engaged to cover the craft for protection. There could also be a servo activated lockdown L-shaped or other styled coupler (22) or locking mechanism, such as an electromagnetic coupling, that can engage with said drone landing assembly to hold the drone in place on the landing deck when not in use to maintain its position during rough sea conditions. Such coupler would further include AC or DC voltage+/−contacts or wireless power means that enable the craft to recharge the system (24) when coupled with the drone. Additionally, the deck may comprise a number of vent and drain ports (26) to provide airflow and drainage.

In a preferred embodiment, a protective dome (20), possibly made from clear or acrylic materials, may be rotated in and out of position by a motor (21) on its side axis into a covered position under the landing deck over the aerial data gathering system (24) and protect it from the elements. The protective dome (20) may have a reflective finish to provide additional thermal protection. The aerial data gathering systems (24) telemetry may be configured to perform the tasks specific to its intended application. In a common occurrence, one task would be to land accurately in the center of the landing deck while avoiding the wind-powered energy collection system (80).

The vessel may comprise an underwater remote operated vehicle or "ROV" data gathering system (48) and a docking bay for an ROV. One or more systems that allow remote operation of the ROV and gather data from it are aboard the vessel and may be relayed or controlled from there by a user. In a preferred embodiment, an underwater ROV data gathering system (48) is attached to the vessel by a tethered cable (52) as well as to computer systems that operate to gather data from the ROV below the surface. Underwater ROV's are well known and in the preferred embodiment of the present invention that is provided using an underwater ROV unit from one or more existing manufacturers such as existing readily available models. Optionally, one could also develop a customized underwater ROV or drone unit if desired.

In a preferred embodiment, an underwater ROV would provide or be modified to comprise one or more of the following: multiple specialized sensor systems (84), lighting, audio sending and receiving devices, and underwater cameras. A connection tether cable (52) may enable communication between the vessel and an underwater ROV and may be further modified to carry a charge to the energy storage system (104) in an underwater ROV (48) for an extended operational dive time. The tethered cable (52) may be connected to an ROV docking bay (46) attached to the vessel that may comprise a bi-directional tension activated motor (56) coupled to a motorized tether spool (54) and a spool cable guiding system (58). A tension activated motor (58) may act on a tethered cable (52) to pull an underwater ROV back to the vessel for docking and the spool cable guidance system (58) ensures the tethered cable is wrapped evenly around the tether spool (52). This is accomplished by using the same type of system as that of a bait casting fishing reel. Additionally, a commutator signal/power connection commutator (57) may allow the signal and power transmission from the tethered cable (52) to connect to the rest of the electrical system. With new developments in technology it may be possible to operate the ROV autonomously without a cable.

As noted above, the energy storage system (104) of the underwater ROV (48) could be charged thru a tethered cable (52), and or optional permanent magnetic charging drogue coupler (60) on the docking port that can recharge batteries onboard the underwater ROV (48), wherein the magnetism could be temporarily deactivated with a computer command generated electrical charge to the coupler (60) to uncouple underwater ROV data gathering system (48). All components of this system would preferably be comprised of components made from corrosion resistant materials and self-lubricating materials such as: Teflon, or Kevlar. Additionally, as is well known in the art; such underwater ROV (48) would further include locomotive thrusters or additional actuators for enabling vertical and horizontal navigation of the ROV (48) when in use.

The vessel may comprise electrical generation and charging systems comprised of multiple components supplying power for multiple systems. The electrical power supply systems may use the energy storage system batteries (104); which may be charged thru a charging circuit system (106) by a solar energy collection system (62) on the upper outer shell module (16); it may also collect energy thru the vessel and by a wave energy capture systems (70) and rotating finned spherical electric generator (72) previously disclosed; both of which may be connected by wiring to a charging circuit system (106); containing, but not limited to one or more of the following combinations of programmable components: an inverters, an inductor, a transistor, a resistor, a capacitor, a rectifier, a diode, and a circuit board; which may all connected to one or more energy storage system batteries (104) and controlled by one or more computers systems (102).

The vessel may also comprise a wind-powered energy collection system (80) using one or more profiles of blades (82) with variable lengths of tower extension masts (86) being interchangeable and of a plug-in nature enabling a user to retrofit a vessel with multiple configurations of wind energy capturing devices and or sensor devices but not limited to devices plugged into plug-in ports (88). Inside a port could be an electrical connection (based on the principle of the standard phone jack by having a spring-loaded rib and) with insulated contacts inside the port to transfer the wind generated energy DC+/−electrical current to the charging system while simultaneously transmitting data thru a data connection (90) at the base of the port which may be used for the for data transmission of multiple specialized sensor systems (84).

The vessel may comprise a navigation system with one or more: components, sensors, and programs networked through one or more computer system(s) (102). The preferred embodiment of the vessel would contain one or more computer system(s) (102) to synchronize all aspects of navigation possibly beginning with either a preprogrammed course or a remote operator/pilot for control of navigation. The vessel may use a GPS connection to obtain coordinates to be used in concert with an onboard geomagnetic sensing device to determine course using best-known practice. Information produced by a wind speed data gathering system (87) and a wind direction sensor (85) may also generate data for determining a course, while also simultaneously/continuously updating and correcting for changing conditions. A command signal sent from said computers and a direct response from a controlled propeller driven propulsion system (38) could act as a primary means of locomotive thrust to deliver the vessel to a chosen location. Additionally, the FIG. 12 system of one or more sails (92) could be deployed in multiple configurations to assist in forward motion of the watercraft, the construction of said sails could be made of high tensile strength material like Kevlar or nylon but is not limited to any material. The sails could be deployed by a sail extension actuator (94) the functionality of said actuators would remain the same throughout the system, deploying sails at optimum location on the craft to provide maximum wind energy capture for the selected course using computer programming to determine which sails would be deployed for the desired results dependent on wind speed and direction, so that when said sails are deployed they would aid in moving the vessel across an expanse of open ocean that commonly has wind. In the preferred embodiment of a hexagonal SWATH design (12), or alternate catamaran design (14), capable of uninterrupted journeys across the open ocean while also comprising the ability to launch aerial data gathering system (24) and/or an underwater ROV data gathering system (48) to any predetermined location or exploratory course on the ocean's surface that receives a satellite signal (118).

The vessel, the aerial vehicle, and the underwater vehicle may all comprise one or more guidance systems (400) with one or more computers (102) that may connect to a satellite GPS/SatFi antenna (96) and/or a WiFi antenna (97) as well as a data connection; including, but not limited, to a Wi-Fi, a Sat-Fi or other means for transmitting digital data. These signals may then be processed by one or more software programs received from a Control Center (122) that can activate one or more components of the navigation system to the vessel, the aerial vehicle, and the underwater vehicle autonomously or; if desired; by a pilot, to a precise destination. A course for the vessel may be achieved by engaging a propeller-driven propulsion system (38) in the underwater torpedo-shaped hulls (30) at different RPM's using auto-correction GPS to maintain course to steer the vessel and may include; without limitation; one or more digital compasses (103) in communication with computers to provide additional guidance data.

The vessel may comprise multiple specialized sensor systems (84) which send their signals to the onboard multiple computers system (102) for transmission back through but not limited to a Wi-Fi or Sat-Fi to a Control Center (122) where multiple data and video feeds may be streamed on; such as, but not limited to: a (virtual private network) VPN, a syndicated network, and/or the internet. There may be scalers and signal converters in the multiple computer systems (102) for continuity of signal. The end user may be an owner or a subscriber. There will be formulations for delivery of content whether it is syndicated, subscription, or device owner delivery. At some point in the signal path content augmentation may be added in and comprise; but is not limited to: music, voice narration, commercials, supporting content, or other information or content.

The vessel, the aerial vehicle, and the underwater vehicle may all have one or more control center(s) (122) that control the one or more guidance systems (400) and may be based at a nearby locations in some cases, or may be digitally transmitted over thousands of miles away using a satellite uplink, VPN or the Internet. A control center (122) will have a screen space for each of the units but not limited to, the (DRTMEVS) vessel (10), aerial data gathering system (24) and an underwater ROV data gathering system (48) or layered in a single computer where the signal can be redirected to any MAC address for fees or as a public service.

The materials utilized in the preferred embodiment for the surface support vessel can be, but is not limited to: aluminum, stainless steel, titanium, carbon fiber, wood, silicone, epoxy, polymers, fiberglass, Coppercoat®, Teflon®, Kevlar®, marine PVC, marine ABS, glass, and gold. Some materials and components may not yet be identified. Some components may be printed by a 3D printer to be manufactured efficiently. Some of the components will be acquired from OEM thru best-known practice of multi-formula outsourcing.

Information as herein shown and described in detail is fully capable of attaining the above-described object of the present disclosure, the presently preferred embodiment of the present disclosure; and is, thus, representative of the subject matter; which is broadly contemplated by the present disclosure. The scope of the present disclosure fully encompasses other embodiments which may become obvious to those skilled in the art, and is to be limited, accordingly, by nothing other than the appended claims, wherein any reference to an element being made in the singular is not intended to mean "one and only one" unless explicitly so stated, but rather "one or more." All structural and functional equivalents to the elements of the above described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for such to be encompassed by the present claims. Furthermore, no element, component, or method step in the present disclosure is intended to be dedicated to the public regardless of whether the element, component, or method step is explicitly recited in the claims. However, that various changes and modifications in form, material, work-piece, and fabrication material detail may be made, without departing from the spirit and scope of the present disclosure, as set forth in the appended claims, as may be apparent to those of ordinary skill in the art, are also encompassed by the present disclosure.

What is claimed is:

1. An unmanned marine vessel system comprising:
   an unmanned surface vessel with a motorized propulsion system, a guidance system, a communication system, an aerial device landing deck, and an underwater device docking bay;
   an unmanned aerial device with a motorized propulsion system, a guidance system, and a communications system capable of data gathering and remote operation;
   wherein said aerial device is capable of landing on said aerial device landing deck;
   an unmanned underwater device with a motorized propulsion system, a guidance system, and a communications system capable of data gathering and remote operation; wherein said underwater device is capable of docking in said underwater device docking bay;
   wherein said aerial device and said underwater device may be controlled from said surface vessel; and
   wherein said surface vessel, said aerial device, and said underwater device are all entirely powered by two or more systems located on said unmanned surface vessel for generating electricity from two or more of the following renewable energy sources: solar energy, wind energy, and wave energy; and
   wherein said surface vessel, said aerial device, and said underwater devices are all remotely operated by radio frequency transmissions.

2. The unmanned marine vessel system of claim 1, wherein said surface vessel further comprises a small waterplane area with a two or more hull exterior and a shallow draft.

3. The unmanned marine vessel system of claim 2, further comprising active stabilizing pontoons that provide stability by sliding up and down on a vertical support strut that also prevents the front of said vessel from tilting downward when a thrust is applied to the rear of the vessel.

4. The unmanned marine vessel system of claim 1, wherein one of said multiple systems for gathering electricity from renewable energy sources comprises a wind turbine.

5. The unmanned marine vessel system of claim 1, further comprising an underwater docking bay for said unmanned underwater device comprising:
   a landing ramp;
   a motorized tether spool;
   a tethered cable spool housing;
   a bi-directional tension activated motor;
   a signal and power connection commutator;
   a spool cable guidance system; and
   a tethered cable; used to send power and data from said unmanned underwater device to said surface vessel.

6. The unmanned marine vessel system of claim 1, wherein one of said multiple systems for gathering electricity from renewable energy sources comprise solar panels.

7. The unmanned marine vessel system of claim 6, wherein said solar panels are arranged in a conical or truncated hexagonal pyramid shape on an upper module of the vessel above the water line and can move themselves in relation to the sun.

8. The unmanned marine vessel system of claim 1, wherein one of said multiple systems for gathering electricity from renewable energy sources comprises a wave energy capture system.

9. The unmanned marine vessel system of claim 8, wherein said such wave energy capture system is located below an upper module above the water and is assisted by the free flow of water beneath said upper module.

10. The unmanned marine vessel system of claim 8, wherein said wave energy capture system comprises a wave action generator comprising:
   a rotating finned sphere capable of floating on water wherein said rotating finned sphere produces electricity by rotating in water.

11. The unmanned marine vessel system of claim 8, wherein said wave energy capture system comprises a wave action generator comprising:
   a curved linear generator;
   a tuning fork-shaped lever; and
   wherein said curved linear generator produces electricity by the up and down motion of waves passing under the vessel.

12. The unmanned marine vessel system of claim 8, wherein said wave energy capture system comprises a wave action generator comprising:
   a rotating finned sphere capable of floating on water;
   a curved linear generator;
   a tuning fork-shaped lever; and
   wherein said rotating finned sphere produces electricity by spinning in water and said curved linear generator produces electricity by the up and down movement of the rotating finned sphere caused by waves because of said tuning fork-shaped lever connecting the two.

13. The unmanned marine vessel system of claim 8, wherein said multiple systems for gathering electricity from renewable energy sources comprise a wave energy capture system and solar panels.

14. The unmanned marine vessel system of claim 1, further comprising an auto-aligning landing deck for said unmanned aerial device that compensates for the rocking of the vessel in waves.

15. The unmanned marine vessel system of claim 14, further comprising a protective dome that opens and closes to cover said auto-aligning landing deck for said unmanned aerial device.

* * * * *